(12) United States Patent
Nikulin et al.

(10) Patent No.: US 12,055,392 B2
(45) Date of Patent: Aug. 6, 2024

(54) SYSTEM AND METHOD FOR UNMANNED AERIAL VEHICLE-BASED MAGNETIC SURVEY

(71) Applicant: The Research Foundation for The State University of new York, Binghamton, NY (US)

(72) Inventors: Alex Nikulin, Vestal, NY (US); Timothy S. De Smet, Endicott, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 156 days.

(21) Appl. No.: 17/321,154

(22) Filed: May 14, 2021

(65) Prior Publication Data
US 2021/0372793 A1 Dec. 2, 2021

Related U.S. Application Data

(60) Provisional application No. 63/032,716, filed on May 31, 2020.

(51) Int. Cl.
*G01C 15/00* (2006.01)
*B64C 39/02* (2023.01)
(Continued)

(52) U.S. Cl.
CPC ............ *G01C 15/00* (2013.01); *B64C 39/024* (2013.01); *G01S 19/40* (2013.01); *G05D 1/106* (2019.05); *B64U 2101/30* (2023.01)

(58) Field of Classification Search
CPC ........ G01C 15/00; G01C 11/02; G01C 21/20; B64C 39/024; G01S 19/40; G01S 19/15;
(Continued)

(56) References Cited

U.S. PATENT DOCUMENTS

| | | | |
|---|---|---|---|
| 9,658,619 B1 * | 5/2017 | Bethke | B64C 39/024 |
| 2016/0068267 A1 * | 3/2016 | Liu | G05D 1/0088 |
| | | | 701/4 |

(Continued)

OTHER PUBLICATIONS

Vladislav Kaminski et al. "Geophysical helicopter-based magnetic methods for locating wells," 2018.*
(Continued)

*Primary Examiner* — Anne Marie Antonucci
*Assistant Examiner* — Misa H Nguyen
(74) *Attorney, Agent, or Firm* — Hoffberg & Associates; Steven M. Hoffberg

(57) ABSTRACT

There are approximately 35,000 abandoned and unplugged oil and gas wells in New York with no known location. Unplugged wells emit methane, a strong greenhouse gas, which has the potential to significantly contribute to global climate change and act as a pollutant chemical. A long-range UAV equipped with methane sensors, MagPike (atomic magnetometer), and LiDAR sensors successfully detected unmarked well sites using characteristic magnetic signals generated by vertical metal piping preserved in the ground. The optimal flight altitude and transect spacing was determined for detection driven by the total field strength of the Earth's magnetic field and the height of tree canopies determined by LiDAR. Traditional methods of identifying oil and gas wells are costly and less powerful in acquisition of data such as using large magnetometers attached to helicopters.

20 Claims, 28 Drawing Sheets

(51) Int. Cl.
  *B64U 101/30*   (2023.01)
  *G01S 19/40*    (2010.01)
  *G05D 1/00*     (2024.01)

(58) Field of Classification Search
  CPC .. G05D 1/106; G05D 1/0646; B64U 2201/30;
                    B64U 2201/00; B64U 2101/30
  See application file for complete search history.

(56) References Cited

U.S. PATENT DOCUMENTS

| | | | | |
|---|---|---|---|---|
| 2017/0210470 A1* | 7/2017 | Pardell | .................... | H02S 40/10 |
| 2017/0334559 A1* | 11/2017 | Bouffard | .............. | G05D 1/0094 |
| 2020/0363556 A1* | 11/2020 | Wu | ........................ | G01V 3/165 |
| 2020/0364456 A1* | 11/2020 | Tran | ....................... | G06Q 50/02 |

OTHER PUBLICATIONS

Alireza Malehmir et al. "The potential of rotary-wing UAV-based magnetic surveys for mineral exploration: A case study from central Sweden," 2017.*

* cited by examiner

SYSTEM AND METHOD FOR UNMANNED AERIAL VEHICLE-BASED MAGNETIC SURVEY

CROSS REFERENCE TO RELATED APPLICATIONS

The present application is a non-provisional of, and claims benefit of priority from, U.S. Provisional Patent Application No. 63/032,716, filed May 31, 2020, the entirety of which is expressly incorporated herein by reference.

FIELD OF THE INVENTION

The present invention relates to magnetometer-based geographical surveys to detect magnetic objects, and more particularly to detection of anthropogenic magnetic anomalies by use of a flying magnetometer.

BACKGROUND OF THE INVENTION

Abandoned and unplugged oil and gas wells present a difficult challenge both as an environmental hazard and a potential economic liability in areas where hydrocarbon exploration and production occurred prior to the adaptation of strict regulations pertaining to wellsite remediation. Recent estimates suggest that just in the United States, there are over 1.2 million undocumented oil and gas wells (Allison and Mandler, 2018). The problem is particularly pronounced in New York State, which was the geographical site of some of the early wide-spread hydrocarbon exploration and production activity in the 19th century, with recent estimates suggesting that at least 35,000 in New York State remain undocumented (Bishop, 2013). Critically, many of the undocumented wells in New York State were abandoned by their original operators and left unplugged or incorrectly plugged. Unplugged wells have the potential to leak methane, which poses a direct environmental threat to drinking water and air quality near the wellsite, and a potent greenhouse gas (Nisbet et al., 2016). The United States Environmental Protection Agency (EPA) estimates that 17% of abandoned wells nationwide are unplugged (Allison and Mandler, 2018); however, this estimate may be conservative as many wells remain undocumented. In New York State, the Department of Environmental Conservation (DEC) Division of Mineral Resources has taken responsibility for mitigating and preventing damage caused by leaking oil and gas wells and the Division of Mineral Resources began documenting oil and gas drilling projects in 1983 (Bishop, 2013). However, New York State's oil and gas boom largely occurred the 19th Century; in 1855 the state was the largest oil and gas producing region in the world. During the New York oil and gas rush, many wells were drilled without proper documentation and were subsequently abandoned without being plugged, or even documented. Many such wells are classified as having been orphaned, a subset of abandoned wells for which no owner can be determined (DEC Orphan & Abandoned Well Plugging, accessed 2019). Of the estimated 61,000 wells drilled prior to regulatory framework, the DEC only has records on approximately 35,000 (Bishop, 2013).

In New York State, the DEC Division of Mineral Resources has taken responsibility for locating and plugging abandoned undocumented wells. Staff of the Division of Mineral Resources locate undocumented wells by initial identification of possible well locations on historic lease maps and subsequent visual inspection of identified sites. This workflow has proven difficult because the surface expression of historic wells may be obscured by vegetation, the wells may have leveled or partially excavated. Furthermore, historic lease maps are often difficult to acquire and even when acquired, well locations must be interpreted from georeferenced maps, a process that inherently introduces location errors. An example of a georeferenced lease map is depicted in FIG. 14; the map was georeferenced using ArcGIS which showed that the transformation is not consistent with the coordinate control points. Furthermore, georeferencing hand drawn features to map coordinates can be erroneous, as shown by the high RMS error in FIG. 14; and even georeferenced maps with an acceptable RMS error contain flaws. Finally, prior to the introduction of a strict regulatory framework mandating consistent documentation of wells, many of the drilled wells were left unmarked and many of the marked wells were left undrilled. As a result, New York State DEC personnel face a difficult task of identifying possible but not definite well locations and confirming their existence by sight in dense brush and uneven terrain. From 2014-2018, only 29 gas wells and 160 oil/injection wells have been plugged leaving 35,000 undocumented oil and gas wells (DEC Completed New York Works Well Plugging Projects, accessed 2019).

Since the 1800s, levels of methane in the atmosphere have tripled and emissions from oil and gas wells contribute to over 19% of total methane levels (Bousquet et al., 2006; Frankenberg et al., 2005). As of 2010, only 25% of oil and gas wells were plugged (Bishop, 2013).

Aeromagnetic anomalies arising from vertically-oriented steel-cased wells produce a distinctive monopolar anomaly resembling a bulls-eye (Frischnecht, 1985; Hammack, 2006). The location of maximum magnetic intensity interpolated from the resulting grid of the geo-located total field aeromagnetic data will be close to the well location on the ground. Further refinements of the well location can be afforded by applying reduction-to-the-pole or analytic signal processing. The total magnetic intensity can vary considerably, depending mainly on the length and size of casing, distance from the sensor, degree of magnetization and remanence (Armstrong, 1973; Baer, 1995). Frequently, production tubing and all or most of the casing were pulled from the wellbore and either salvaged for reuse or sold for scrap. These wells will display little or no magnetic response. A weak and broad monopole anomaly usually indicates some quantity of non-retrievable casing remains in the wellbore. Short of excavation, it may be very difficult or impossible to find the wellbore without a wellhead, casing at the surface, or other infrastructure. There are also intact wells impacted by surface mining of coal. Examples of these have been observed and were a subject of investigation from a recent aeromagnetic survey in Hillman State Park, near Burgettstown, Pa. (Sams, 2017). See, Garret et al. (2018).

Old wells pose significant environmental and economic challenges in areas where hydrocarbon development took place, or where it may take place in the coming years. With recent estimates suggesting that there are over 320,000 orphaned wells just in the United States it is critical to consider low-cost wide-area survey methodologies to detect and identify orphaned wells for their subsequent remediation. Recent advances in autonomous unmanned aerial vehicle (UAV) technology, coupled with successful efforts to miniaturize total field magnetometers offer a unique opportunity to deploy UAV-mounted systems for wide-area high-resolution magnetic surveys.

Automated UAV-based aeromagnetic surveys are a paradigm shift in near-surface geophysics, as they drastically reduce the time, labor, and cost associated with detecting orphaned oil and gas well, even in heavily forested areas. This service provides critical resource relief to both public sector environmental management entities, as well as private natural resource exploration companies. Specifically, UAV-based magnetic survey methods have several key advantages both over terrestrial and piloted aeromagnetic surveys: in particular, ease of use, lower cost, portability, repeatability, and operator safety. Currently, licensed operation of UAV platforms requires less training to receive accreditation than a traditional FAA pilot license. The initial purchase cost of a helicopter magnetic system is an order of magnitude more than a UAS-based magnetic system (Versteeg et al. 2007). The operating costs of UAVs are much less because they do not require a hanger for storage, a pilot, or aircraft fuel). Furthermore, a UAS is much more portable than any piloted platform, requires less maintenance, and less storage space, further reducing overall operational costs. Because UAS surveys fly GNSS-guided autonomous missions, which are more repeatable and therefore more reproducible than piloted missions, allowing measurement of change over time. Finally, mindfully designed and executed UAS surveys are safer than piloted missions and even in the event of a crash an unpiloted system poses a reduced threat to the operator, ground personnel, people, and structures.

There are traditional terrestrial geophysics surveys companies that operate relying on ground-based geophysical surveys tools, piloted geophysical survey operators, and a small group of UAV-based geophysical companies operating using battery-powered UAVs.

Commercial implementation of automated UAS-based magnetic survey methods have several key advantages stemming from their autonomous operation design when compared to terrestrial surveys, namely a) increased survey speed and size, b) lower cost c) greater operational efficiency, and d) increased survey safety. UAS magnetic surveys are much faster than traditional terrestrial survey methods, which greatly decreases exploration time per unit area and although the initial investment in UAS-magnetic sensors and a UAS platform are relatively high the long-term costs are much lower because larger areas can be surveyed in much less time. Critically, UAS aeromagnetic surveys can be conducted over hazardous environments and difficult terrain that may otherwise be effectively inaccessible for terrestrial or piloted surveys at low altitudes. As a result, there is considerable commercial interest in automated aeromagnetic surveying stemming both from state and private entities engaged in environmental management, as well as private industries engaged in energy exploration and production activity.

There are several challenges associated with UAS magnetic surveys that should be noted. Depending upon the survey location logistics can increase the difficulty of surveying. Depending upon the UAS platform, spare parts, proper fuel, and availability and stability of GNSS signal can be a logistical and practical limiting factor. A battery-powered UAS capable of lifting the required payload, for instance, can only reasonably collect data for 15-20 minutes. Furthermore, operation of the UAS systems introduces some magnetic noise, however, this is not different than either terrestrial or helicopter-based surveys.

Available magnetic sensors include a Micro-Fabricated Atomic Magnetometer (MFAM) built by Geometrics, Inc. See, mfam.geometrics.com/atomicmagnetomet.html. MFAM is a solid-state, laser-pumped atomic magnetometer. Redundant, dual sensors may be positioned such that the flightpath of the survey vehicle is orthogonal to the optical axis to optimize signal and to avoid the narrow dead zone at normal flight attitudes. See also, U.S. Pat. No. 10,591,872, Microfabricated atomic clocks and magnetometers utilizing side recesses, U.S. Pat. No. 10,409,227, Temperature gradient in microfabricated sensor cavity, US 20180329106, Noise Reduction For Total Field Magnetometer Measurements, US 20180259600, Microfabricated Atomic Clocks And Magnetometers Utilizing Side Recesses, US 20180259596, Concave Cavity For Integrated Microfabricated Sensor, and US 20180038921, Temperature Gradient In Microfabricated Sensor Cavity.

A distinct problem is the detection and localization of unexploded ordnance. Nikulin, Alex, and Timothy de Smet. "Aeromagnetic Surveys to Detect MBRL Unexploded Ordnance Dataset 2." (2020) discusses location of unexploded ordinance (UXO) from Self-propelled Multiple Barrel Rocket Launcher (MBRL) systems. Electromagnetic induction (EMI) and magnetometry surveys remain robust and widely applied tools of UXO and MEC detection and classification. Despite their high sensitivity, traditional EMI surveys are known to be less effective against deeply buried UXO objects, in wide-area surveys, and in the presence of metallic debris (Kasban et al., 2010). Recently, low-altitude TFM surveys conducted from helicopters demonstrated significant potential in their ability to successfully detect areas of UXO concentrations, as well as successfully identify large individual MEC objects (Gamey et al., 2000). Early versions of these systems were composed of three cesium vapors magnetometers with 6 m spacing mounted on one forward and two lateral booms and carried by a Bell 206 Long Ranger helicopter platform. (Gamey and Mahler, 1999). While demonstrating encouraging results in wide-area UXO detection, an inherent limitation of helicopter-based system is its high cost of operation and electromagnetic noise from the rotor of the aircraft (Doll et al., 2008).

In the specific scenario of MBRL-generated UXOs, the need for rapid wide-area assessment of UXO presence is particularly important, as in this scenario, traditional methods of UXO detection and remediation are largely inapplicable. Demining surveys based on electromagnetic principles can easily locate the largely metallic MBRL UXOs, yet the costs of these surveys over wide areas are largely prohibitive in post-conflict developing countries. Additionally, MBRL rounds may impact the soil at a high angle, penetrating the ground and burying the UXO at a depth beyond the effective range of EMI systems, further complicating their detection and identification. Finally, because MBRL UXOs are inherently mixed with fragments of exploded MBRL rounds, areas of barrage impacts contain large amounts of small metallic debris, greatly increasing the rate of false flags and further slowing down the process of wide-area UXO remediation. Attempts to complement or substitute terrestrial TDEM and TFM surveys with other geophysical methods targeting wide-area UXO detection and classification had limited success. Seismic and acoustic methods, as well as surveys focused on gravimetry have had limited applicability and have largely been discarded as viable methodologies of MEC detection and classification (Butler, 2001). Likewise, ground penetrating radar (GPR) surveys have found limited use in large area UXO surveys, with direct applicability only in small-scale UXO discrimination and identification surveys (Butler 2001).

Advances in UAV technology coupled with successful efforts to miniaturize total field magnetometers allow for a unique opportunity to test a UAV-mounted system for wide-area high-resolution magnetic surveys targeting UXO detection. Driving this development is the recent commercial availability of light-weight low-power consumption laser-pumped atomic TFMs (Prouty and Tchernychev 2016; Schultz et al. 2016), which record the precession frequency of atoms in a magnetic field. An atom's magnetic moment processes around the magnetic field vector, with a frequency proportional to the magnetic field being measured. Atomic precession frequency, and by extension, the magnetic field, may be determined to very high precision and sensitivity (pT). Critically, total field magnetometers, such as the recently released Micro-Fabricated Atomic Magnetometer (MFAM) by Geometrics, record magnetic field magnitude and unlike vector magnetometers, provide measurements largely insensitive to orientation and vibration. This allows total field magnetometers to be used in aerial geophysical object search surveys, and their small mass allows them to be mounted on commercially available multi-rotor UAV platforms (Nikulin and de Smet, 2019).

In parallel with magnetometer sensor miniaturization, commercial multirotor UAVs have become a common site in recent years. However, most multirotor UAVs remain powered by lithium-ion (LiI) and lithium-polymer (LiPo) batteries, which, due to their weight provide a restriction on both payload and flight time. Currently, the average flight time for a commercially-available hexacopter, with a payload of less than 3 kg, ranges from 15-25 minutes and this time further drops in colder temperatures of operation. This flight duration, while largely acceptable for dense surveying of a confined area (de Smet et al., 2018), or coarse scanning over a wide area (Nikulin and de Smet, 2019), is prohibitive when wide-area high-precision scanning is required. Critically, in applications related to UXO and MEC detection, densely-spaced low-altitude magnetic surveys are needed to provide sufficient sampling to allow for analysis of relatively small metallic objects.

One solution to extend UAV survey time is the use of a hybrid UAV power module with a gas-powered engine powering an electric generator, which, in turn provides uninterrupted electric power to the UAV. The hybrid gas-electric UMT Cicada-M hexacopter manufactured by Ukrainian Multirotor Technologies, using a Foxtech NOVA-2000 generator with Landing Gear as the motor-generator (www-.foxtechfpv.com/foxtech-nova-2000-generator.html), is a useful example discussed further herein. Due to the combined 2 kW power module, this UAV is able to stay in the air considerably longer compared to traditional electric drones powered by LiI and LiPo batteries. With a payload of 3 kg, the Cicada-M remains in the air for a maximum flight time of 150 minutes, significantly extending useful survey time needed for high-resolution magnetic acquisition. Critically, the Cicada-M is equipped with RTK GPS modules allowing autonomous low-altitude data collection along densely spaced grid lines. Increased instrument sensitivity, coupled with low flight altitudes, higher survey density and extended flight times offered by the hybrid UAV platform, allow identification of anthropogenic targets previously only identifiable in ground magnetometer surveys.

Butler (2001) discussed the importance of accounting for background "noise" that may clutter the data and make the anomalies less distinct in the study of magnetic backgrounds in UXO detection.

Kaminski et al (2018) provides no diurnal correction; TMI spatial position was calculated using differential Global Positioning Systems, and the helicopter altitude was determined using an aircraft-mounted laser and radar measurements; At the NPR3 site, two cesium vapor magnetometers separated by 13.4 m were used to remove geomagnetic drift. The same data processing techniques were used as in the SCOF site. The aircraft elevation was 20 m, line spacing was 25 m, and average aircraft speed was approximately 35-40 m/s.

United Research Services Energy and Construction (2014) discusses a total of 590 line-km (1,936,000 ft) of aeromagnetic survey data were collected between Jul. 25 and 26, 2014, over Hillman State Park. The helicopter was equipped with two Scintrex (CS-3) cesium vapor magnetic sensors that were mounted on the ends of transverse booms attached to the helicopter. The magnetic sensors, which had a sensitivity of 0.01 nT and a sampling rate of 10 Hz, collected 437,448 magnetic soundings (2.5 m [8.2 ft] along line spacing) within Hillman State Park. The aeromagnetic survey was flown as a series of parallel flight lines spaced 30 m (98 ft) apart in a magnetic north-south (351°) direction. The average survey altitude was 46 m (150 ft) above ground level. Preprocessing of the raw aeromagnetic data were performed by the NETL contractor and included compensation for errant magnetic fields induced by the helicopter, corrections for diurnal variation in Earth's magnetic field, and leveling of data to reduce aberrations caused by sensor drift and heading errors. Then NETL employed standard image processing methods to create a bump map in which, upon correcting for magnetic inclination, distinctive bull's-eye anomalies appear centered over steel cased wells.

U.S. Ser. No. 10/241,224 relates to a system and method for airborne geophysical exploration, and discusses a system and method for airborne geophysical exploration over the ground are disclosed. In one embodiment of the system, two towing bodies are towed behind an aircraft in flight in a vertically spaced-apart relation above a ground station. Respective magnetometer measurement instruments are located within each of the towing bodies and the ground station. Each magnetometer measurement instrument collects total field magnitude data to contribute to the magnetic vertical gradient data relative to magnetic crustal anomalies of geological origin and variations in an ambient magnetic field above the surface area of the survey. Each magnetometer measurement instrument also collects location, time, and inertial data substantially simultaneously with the total field magnitude data to provide position-correlated measurements thereof.

In statistics, originally in geostatistics, kriging or Gaussian process regression is a method of interpolation for which the interpolated values are modeled by a Gaussian process governed by prior covariances. Under suitable assumptions on the priors, kriging gives the best linear unbiased prediction of the intermediate values. Interpolating methods based on other criteria such as smoothness (e.g., smoothing spline) may not yield the most likely intermediate values. The method is widely used in the domain of spatial analysis and computer experiments. The technique is also known as Wiener-Kolmogorov prediction, after Norbert Wiener and Andrey Kolmogorov.

The basic idea of kriging is to predict the value of a function at a given point by computing a weighted average of the known values of the function in the neighborhood of the point. The method is mathematically closely related to regression analysis. Both theories derive a best linear unbiased estimator, based on assumptions on covariances, make use of Gauss-Markov theorem to prove independence of the estimate and error, and make use of very similar formulae. Even so, they are useful in different frameworks: kriging is made for estimation of a single realization of a random field, while regression models are based on multiple observations of a multivariate data set.

The kriging estimation may also be seen as a spline in a reproducing kernel Hilbert space, with the reproducing kernel given by the covariance function. The difference with the classical kriging approach is provided by the interpretation: while the spline is motivated by a minimum norm interpolation based on a Hilbert space structure, kriging is motivated by an expected squared prediction error based on a stochastic model. Kriging with polynomial trend surfaces is mathematically identical to generalized least squares polynomial curve fitting.

Kriging can also be understood as a form of Bayesian inference. Kriging starts with a prior distribution over functions. This prior takes the form of a Gaussian process: samples from a function will be normally distributed, where the covariance between any two samples is the covariance function (or kernel) of the Gaussian process evaluated at the spatial location of two points. A set of values is then observed, each value associated with a spatial location. Now, a new value can be predicted at any new spatial location, by combining the Gaussian prior with a Gaussian likelihood function for each of the observed values. The resulting posterior distribution is also Gaussian, with a mean and covariance that can be simply computed from the observed values, their variance, and the kernel matrix derived from the prior.

In geostatistical models, sampled data is interpreted as the result of a random process. The fact that these models incorporate uncertainty in their conceptualization doesn't mean that the phenomenon—the forest, the aquifer, the mineral deposit—has resulted from a random process, but rather it allows one to build a methodological basis for the spatial inference of quantities in unobserved locations, and to quantify the uncertainty associated with the estimator. A stochastic process is, in the context of this model, simply a way to approach the set of data collected from the samples.

REFERENCES

Each reference cited herein is expressly incorporated herein by reference in its entirety.

Adamson, Mackenzie. "Drone Aeromagnetics: A New Method for Locating Abandoned Oil and Gas Wells." M.S. Thesis (2017), University at Buffalo (Used a Potassium vapor magnetometer and is prohibitively heavy)

Barris, J. (2008) An expert system for appraisal by the method of comparison. PhD Thesis, UPC, Barcelona Barris, Joaquim, and Pilar Garcia Almirall. A density function of the appraisal value Calculation and evaluation of the empirical density function of the appraisal value based on comparison method, spatial correlation techniques, resampling methods, compliant with the Spanish legal framework. No. eres2011-135. European Real Estate Society (ERES), 2011.

"Kriging" (2021) en.wikipedia.org/wiki/Kriging

Baur, Jasper, et al. "Applying Deep Learning to Automate UAV-Based Detection of Scatterable Landmines." Remote Sensing 12.5 (2020): 859.

Baur, Jasper, Timothy S. de Smet, and Alex Nikulin. "Applied geographic object based image analysis in UAV-based plastic landmine detection and identification." AGUFM 2019 (2019): EP13A-07.

Bayraktar, Hanefi; Sezer, Turalioglu (2005). "A Kriging-based approach for locating a sampling site—in the assessment of air quality". SERRA. 19 (4): 301-305. doi:10.1007/s00477-005-0234-8.

Beard, L. P., Doll, W. E., Gamey, T. J., Holladay, J. S., Lee, J. L., Eklund, N. W., Sheehan, J. R. and Norton, J., 2008. Comparison of performance of airborne magnetic and transient electromagnetic systems for ordnance detection and mapping. Journal of Environmental & Engineering Geophysics, 13(3), pp. 291-305.

Bellstedt, Sabine; Forbes, Duncan; Foster, Caroline; Romanowsky, Aaron; Brodie, Jean; Pastorello, Nicola; Alabi, Adebusola; Villaume, Alexa (2017). "The SLUGGS survey: using extended stellar kinematics to disentangle the formation histories of low-mass S) galaxies". Monthly Notices of the Royal Astronomical Society. 467: 4540-4557. arXiv:1702.05099. doi:10.1093/mnras/stx418.

Brehm, M., 2016. Un-/Acceptable Area Effects? Assessing Risk of Civilian Harm from the Use of Explosive Weapons in Populated Areas in Three Cases Before the ICTY. Weapons and the International Rule of Law, 39th Round Table on Current Issues of International Humanitarian Law, pp. 167-185.

Bruschini, C. and Gros, B., 1998. A survey of research on sensor technology for landmine detection. Journal of Conventional Weapons Destruction, 2.

Butler, D. K., 2003. Implications of magnetic backgrounds for unexploded ordnance detection. Journal of Applied Geophysics, 54(1-2), pp. 111-125.

Chiles, J.-P. and P. Delfiner (1999) Geostatistics, Modeling Spatial Uncertainty, Wiley Series in Probability and statistics.

Derouin, Sarah, "The Drones That Track Down Buried Warheads", Popular Mechanics (Jan. 6, 2020), www.popularmechanics.com/flight/drones/a30418522/drones-buried-warheads/ deSmet, T., Nikulin, A., Frazer, W., Baur, J., Abramowitz, J., Finan, D., Denara, S., Aglietti, N. and Campos, G., 2018. Drones and "Butterflies": A Low-Cost UAV System for Rapid Detection and Identification of Unconventional Minefields. Journal of Conventional Weapons Destruction, 22(3), p. 10.

Doll, W. E., Gamey, T. J., Beard, L. P. and Bell, D. T., 2006. Airborne vertical magnetic gradient for near-surface applications. The Leading Edge, 25(1), pp. 50-53.

Doll, William E., Jacob R. Sheehan, T. Jeffrey Gamey, Les P. Beard, and Jeannemarie Norton. "Results of an airborne vertical magnetic gradient demonstration, New Mexico." Journal of Environmental & Engineering Geophysics 13, no. 3 (2008): 277-290.

Du, Dewen, Shijuan Yan, Fengli Yang, Zhiwei Zhu, Qinglei Song, and Gang Yang. "Kriging Interpolation for Evaluating the Mineral Resources of Cobalt-Rich Crusts on Magellan Seamounts." Minerals 8, no. 9 (2018): 374.

Dullum, O. S., Fulmer, K., Jenzen-Jones, N. R., Lincoln-Jones, C. and Palacio, D., 2017. Indirect Fire: A technical analysis of the employment, accuracy, and effects of indirect-fire artillery weapons. Armament Research Services (ARES) Special Report, Perth, Australia, pp. 77-81.

Emery, X. (2005). "Simple and Ordinary Multigaussian Kriging for Estimating Recoverable Reserves". Mathematical Geology. 37 (3): 295-319. doi:10.1007/s11004-005-1560-6.

Fishman, Neil S., et al. "Detection Of The Oil, Natural Gas, And Coal Production Infrastructure By Magnetic Surveys, Front Range Of Colorado." 14th EEGS Symposium on the Application of Geophysics to Engineering and Environmental Problems. European Association of Geoscientists & Engineers, 2001.

Foster, Caroline; Pastorello, Nicola; Roediger, Joel; Brodie, Jean; Forbes, Duncan; Kartha, Sreeja; Pota, Vincenzo; Romanowsky, Aaron; Spitler, Lee; Strader, Jay; Usher, Christopher; Arnold, Jacob (2016). "The SLUGGS survey: stellar kinematics, kinemetry and trends at large radii in 25 early-type galaxies". Monthly Notices of the Royal Astronomical Society. 457: 147-171. arXiv:1512.06130. doi:10.1093/mnras/stv2947.

Frischknecht, Frank C., et al. Location of abandoned wells by magnetic surveys; acquisition and interpretation of aeromagnetic data for five test areas. No. 85-614-A. US Geological Survey, 1985.

Gamey, T. J. and Mahler, R., 1999, January. A comparison of towed and mounted helicopter magnetometer systems for UXO detection. In Symposium on the Application of Geophysics to Engineering and Environmental Problems 1999 (pp. 783-792). Society of Exploration Geophysicists.

Garret A. Veloski, Richard G. Hammack, James I. Sams III, Luke D. Wylie, Kenneth Heirendt, "Evaluation Of The Micro-Fabricated Atomic Magnetometer Deployed From A Small Autonomous Rotorcraft For Locating Legacy Oil & Gas Wells", EEGS Annual Meeting Nashville, Tenn. USA Mar. 25-29, 2018 SAGEEP 2018

Gamey, T. J., Doll, W. E., Bell, D. T., Duffy, A. and Millhouse, S. D., 2000, February. Evaluation of improved airborne techniques for detection of UXO. In 13th EEGS Symposium on the Application of Geophysics to Engineering and Environmental Problems (pp. cp-200). European Association of Geoscientists & Engineers.

Goovaerts (1997) Geostatistics for natural resource evaluation, OUP. ISBN 0-19-511538-4

Hammack, R. W., and G. A. Veloski. New Strategies for Finding Abandoned Wells at Proposed Geologic Storage Sites for CO2. No. DOE/NETL-IR-2007-207. National Energy Technology Laboratory (NETL), Pittsburgh, Pa., Morgantown, W. Va., and Albany, Oreg. (United States), 2007.

Hammack, Richard W., and Garret A. Veloski. "Methods for Finding Legacy Wells in Residential and Commercial Areas" No. NETL-PUB-20581; NETL-TRS-5-2016. National Energy Technology Lab. (NETL), Pittsburgh, Pa., (United States). In-house Research, 2016.

Hammack, Richard W., Garret Veloski, and James Sams. "Using Drone Magnetic and LiDAR Surveys to Locate Unmarked, Abandoned Wells Prior to Unconventional Oil and Gas Development." Unconventional Resources Technology Conference (URTEC), 2018. (see, US Aerial Video Inc., a/k/a UAV Exploration www.uavex.com/, and their "NETL LiDAR"/Maser Consulting LiDAR)

Hammack, Richard, et al. "An evaluation of helicopter and ground methods for locating existing wells." 19th EEGS Symposium on the Application of Geophysics to Engineering and Environmental Problems. European Association of Geoscientists & Engineers, 2006.

Hammack, Richard, et al. No. NETL-PUB-20579. National Energy Technology Lab. (NETL), Pittsburgh, Pa., (United States), 2016.

Hammack, Richard, Garret Veloski, and James Sams. "Rapid Methods for Locating Existing Well Penetrations in Unconventional Well Development Areas of Pennsylvania." Unconventional Resources Technology Conference, San Antonio, Tex., 20-22 Jul. 2015. Society of Exploration Geophysicists, American Association of Petroleum Geologists, Society of Petroleum Engineers, 2015.

Johnson, K. J., Minor, C. P., Guthrie, V. N. and Rose-Pehrsson, S. L., 2009. Intelligent data fusion for wide-area assessment of UXO contamination. Stochastic Environmental Research and Risk Assessment, 23(2), pp. 237-252.

Journel, A. G. and C. J. Huijbregts (1978) Mining Geostatistics, Academic Press London Kaminski, Vladislav, Richard W. Hammack, William Harbert, Garret A. Veloski, James Sams, and D. Greg Hodges. "Geophysical helicopter-based magnetic methods for locating wells." Geophysics 83, no. 5 (2018): B269-B279.

Koziel, Slawomir (2011). "Accurate modeling of microwave devices using kriging-corrected space mapping surrogates". International Journal of Numerical Modelling: Electronic Networks, Devices and Fields. 25: 1-14. doi: 10.1002/jnm.803.

Krishna, Vamsi, Eduardo Lima Simões da Silva, and Arne Dossing. "Experiments on magnetic interference for a portable airborne magnetometry system using a hybrid unmanned aerial vehicle (UAV)." Geoscientific Instrumentation, Methods and Data Systems 10, no. 1 (2021): 25-34.

Nikulin, Alex, and Timothy de Smet. "Aeromagnetic Surveys to Detect MBRL Unexploded Ordnance Dataset 1.", "Aeromagnetic Surveys to Detect MBRL Unexploded Ordnance Dataset 2." (2020).

Nikulin, Alex, and Timothy S. de Smet. "A UAV-based magnetic survey method to detect and identify orphaned oil and gas wells." The Leading Edge 38.6 (2019): 447-452.

Nikulin, Alex, et al. "Implementation of a UAV-Based Aeromagnetic Survey System to Detect and Identify MBRL Unexploded Ordnance in Post-Conflict Areas." AGUFM 2019 (2019): EP11C-2128. (use a total horizontal derivative filters, which maintain data fidelity and is quantitative)

Oghenekarho Okobiah, Saraju Mohanty, and Elias Kougianos (2013) Geostatistical-Inspired Fast Layout Optimization of a Nano-CMOS Thermal Sensor, IET Circuits, Devices and Systems (CDS), Vol. 7, No. 5, September 2013, pp. 253-262.

Olea, Ricardo A. (1999). Geostatistics for Engineers and Earth Scientists. Kluwer Academic. ISBN 978-1-4615-5001-3.

Pajcin, M., Bugaric, U., Petrovic, D. and Petrovic, Z., 2013. An efficient and economical way of artillery rocket revamping and upgrading. Metalurgia International, 18(5), p. 186.

Papritz, A.; Stein, A. (2002). "Spatial prediction by linear kriging". Spatial Statistics for Remote Sensing. Remote Sensing and Digital Image Processing. 1. p. 83. doi: 10.1007/0-306-47647-9_6. ISBN 0-7923-5978-X.

Pastorello, Nicola (2014). "The SLUGGS survey: exploring the metallicity gradients of nearby early-type galaxies to large radii". Monthly Notices of the Royal Astronomical Society. 442: 1003-1039. arXiv:1405.2338. doi:10.1093/mnras/stu937.

Pekney, Natalie J., et al. Methane emissions from abandoned oil and gas wells: A case study in Oil Creek State Park Pennsylvania. No. NETL-PUB-22194. NETL, 2018.

Pekney, Natalie J., et al., "Carbon Management 9.2 (2018): 165-175.

Prouty, M. D. and Tchernychev, M., 2016, May. Real-time threat detection using magnetometer arrays. In Sensors, and Command, Control, Communications, and Intelligence (C3I) Technologies for Homeland Security, Defense, and Law Enforcement Applications XV (Vol. 9825, p. 98250A). International Society for Optics and Photonics.

Richmond, A. (2003). "Financially Efficient Ore Selections Incorporating Grade Uncertainty". Mathematical Geology. 35 (2): 195-215. doi:10.1023/A:1023239606028.

Sacks, J.; Welch, W. J.; Mitchell, T. J.; Wynn, H. P. (1989). "Design and Analysis of Computer Experiments". 4 (4). Statistical Science: 409-435. JSTOR 2245858.

Sams, J. I., G. A. Veloski, J. R. Diehl, and R. W. Hammack, 2017, "Methods and challenges to locating legacy wells in western Pennsylvania: Case study at Hillman State Park", Environmental Geosciences, 24, no. 2, 95-112, doi.org/10.1306/eg.1 22116160 0417009.

Schultz, G., Mhaskar, R., Prouty, M. and Miller, J., 2016, May. Integration of micro-fabricated atomic magnetometers on military systems. In Detection and Sensing of Mines, Explosive Objects, and Obscured Targets XXI (Vol. 9823, p. 982318). International Society for Optics and Photonics.

Smith, D. L., 1995, June. Detection technologies for mines and mine-like targets. In Detection Technologies for Mines and Mine-like Targets (Vol. 2496, pp. 404-408). International Society for Optics and Photonics.

Tonkin, M. J.; Larson, S. P. (2002). "Kriging Water Levels with a Regional-Linear and Point-Logarithmic Drift". Ground Water. 40 (2): 185-193. doi:10.1111/j.1745-6584.2002.tb02503.x. PMID 11916123.

Tuck, L., et al. "Magnetic interference testing method for an electric fixed-wing unmanned aircraft system (UAS)." Journal of Unmanned Vehicle Systems 6.3 (2018): 177-194.

Tuck, L., Samson, C., Laliberté, J., Cunningham, M., "Magnetic interference mapping of four types of unmanned aircraft systems intended for aeromagnetic surveying", December 2020, DOI: 10.5194/gi-2020-38

United Research Services Energy and Construction, 2014, A geophysical survey report—Midas high resolution magnetic and methane leak detection survey Hillman, Susquehannock, oil creek blocks and pipeline route, Pennsylvania: Pittsburgh, Pa., United Research Services Energy and Construction, 88 p.

Veloski, Garret A., et al. "Evaluation of the Micro-Fabricated Atomic Magnetometer Deployed from a Small Autonomous Rotorcraft for Locating Legacy Oil & Gas Wells." Symposium on the Application of Geophysics to Engineering and Environmental Problems 2018. Society of Exploration Geophysicists and Environment and Engineering Geophysical Society, 2018. (See, www.uavex.com)

Versteeg, Roelof, Mark McKay, Matt Anderson, Ross Johnson, Bob Selfridge, and Jay Bennett. 2007. Feasibility Study for an Autonomous UAV—Magnetometer System. Final Report on SERDP SEED 1509:2206.

Wahba, Grace (1990). Spline Models for Observational Data. Math., SIAM 59. doi:10.1137/1.9781611970128.

Walter, Callum A., A. Braun, and G. Fotopoulos. "High-Resolution UAV Magnetometry Surveys for Localizing Legacy/Abandoned Wells." Geoconvention May 13-17, 2019

Wiebe, V., 2000. Footprints of death: Cluster bombs as indiscriminate weapons under international humanitarian law. Mich. J. Int'l L., 22, p. 85.

Williams, C. K. I. (1998). "Prediction with Gaussian Processes: From Linear Regression to Linear Prediction and Beyond". Learning in Graphical Models. pp. 599-621. doi:10.1007/978-94-011-5014-9_23. ISBN 978-94-010-6104-9.

Wong, Samantha H., et al. "Deploying a UAV-Based System to Identify Methane-Emitting Oil and Gas Wells." AGU Fall Meeting Abstracts. 2018.

Zimmerman, D. A.; De Marsily, G.; Gotway, C. A.; Marietta, M. G.; Axness, C. L.; Beauheim, R. L.; Bras, R. L.; Carrera, J.; Dagan, G.; Davies, P. B.; Gallegos, D. P.; Galli, A.; Gomez-Hernandez, J.; Grindrod, P.; Gutjahr, A. L.; Kitanidis, P. K.; Lavenue, A. M.; McLaughlin, D.; Neuman, S. P.; Ramarao, B. S.; Ravenne, C.; Rubin, Y. (1998). "A comparison of seven geostatistically based inverse approaches to estimate transmissivities for modeling advective transport by groundwater flow" (PDF). Water Resources Research. 34 (6): 1373-1413. Bibcode: 1998WRR . . . 34.1373Z. doi:10.1029/98WR00003.

U.S. Patent and Published Patent Application Nos. U.S. Pat. Nos. 6,255,825; 6,845,936; 7,002,349; 7,830,150; 7,834,801; 8,392,142; 9,677,864; 9,807,724; 9,934,682; 10,031,234; 10,241,224; 10,244,362; 10,591,872; 20050285598; 20060055584; 20060074557; 20080125920; 20090120653; 20090321094; 20090326736; 20100049441; 20100145556; 20100152933; 20100198514; 20110019558; 20110035149; 20110295569; 20110315817; 20120001020; 20120043411; 20120267473; 20130054054; 20130146718; 20130311009; 20140172200; 20140316614; 20150014482; 20150160658; 20150203201; 20150314870; 20150336667; 20150336668; 20150336669; 20150339933; 20150346722; 20150353206; 20150379874; 20160009370; 20160023762; 20160025457; 20160035224; 20160039300; 20160039536; 20160039542; 20160059963; 20160076892; 20160107750; 20160111006; 20160125740; 20160157414; 20160167807; 20160180717; 20160185445; 20160185447; 20160189101; 20160196525; 20160217694; 20160236778; 20160247115; 20160266579; 20160300492; 20160300493; 20160300495; 20160304217; 20160307448; 20160332748; 20160339789; 20160340006; 20160351089; 20160364989; 20160364990; 20160371984; 20160378109; 20170001724; 20170043871; 20170045894; 20170069214; 20170081026; 20170083979; 20170088288; 20170106986; 20170127652; 20170144749; 20170158338; 20170162064; 20170193707; 20170210470; 20170215381; 20170227965; 20170250805; 20170253330; 20170253334; 20170313421; 20170313422; 20170316375; 20170316376; 20170316510; 20170316699; 20170316701; 20170329351; 20170334559; 20170337218; 20170337219; 20170341776; 20170349267; 20170351254; 20170355458; 20170361929; 20170372256; 20180006356; 20180009527; 20180016005; 20180018884; 20180025434; 20180033320; 20180038695; 20180038921; 20180046187; 20180062785; 20180062786; 20180072419; 20180077902; 20180081439; 20180086455; 20180086456; 20180086457; 20180088578; 20180089611; 20180089622; 20180091908; 20180093755; 20180095460; 20180095464; 20180121877; 20180134388; 20180137454; 20180141682; 20180155027; 20180155028; 20180155029; 20180155030; 20180155031; 20180155032; 20180156616; 20180158197; 20180165504; 20180194445; 20180203470; 20180218614; 20180229841; 20180237137;

20180245365; 20180251219; 20180251234; 20180259596; 20180259600; 20180291579; 20180300834; 20180312252; 20180314994; 20180314995; 20180319494; 20180321041; 20180322443; 20180329106; 20180348760; 20180349840; 20180364740; 20180371894; 20180373269; 20190011921; 20190023415; 20190030475; 20190047695; 20190047700; 20190061944; 20190077503; 20190077519; 20190094149; 20190101934; 20190107845; 20190116758; 20190122172; 20190135432; 20190144113; 20190161190; 20190168036; 20190174149; 20190185161; 20190227826; 20190250601; 20190259280; 20190265694; 20190277635; 20190280859; 20190306757; 20190317502; 20190346925; 20190359351; 20190375504; 20190377345; 20190378423; 20190381441; 20190384318; 20200005656; 20200010194; 20200021954; 20200034620; 20200036896; 20200039636; 20200041560; 20200051003; 20200102074; 20200108924; 20200108925; 20200125101; 20200140120; 20200143718; 20200160728; and 20200166938.

SUMMARY OF THE INVENTION

The present invention provides, according to one embodiment, a UAV-based aeromagnetic survey system to autonomously detect and identify abandoned and unmarked oil and gas wells in an area of historical hydrocarbon exploration. It also provides wide-area survey methodologies to detect and identify orphaned wells for their subsequent remediation.

The present invention provides, according to another embodiment, a UAV-based aeromagnetic survey system to autonomously detect and identify unexploded ordnance in an area.

Unmanned aerial vehicle (UAV) technology, coupled with successful efforts to miniaturize total field magnetometers offer a unique opportunity to deploy UAV-mounted systems for wide-area high-resolution magnetic surveys.

The present technology allows definitive detection of magnetic anomalies associated with metal casing of vertical wells are pronounced considerably above background levels both at the surface and up to 50 m above-ground elevation, considerably above the maximum height of the tree line. The present technology allowed a long-time flight with an unmanned aerial vehicle, (>120 minutes), permitting wide-area surveys (>1 km$^2$).

A digital obstacle model (DOM) is employed, to avoid survey interference at low altitudes, thereby permitting most of the survey to be conducted at a low altitude which would otherwise be obstructed by tall trees and other tall objects.

Diurnal magnetic field variations are compensated, which is an important consideration given the extended flight time. Other corrections re also applied.

Data collection methods are employed to maximize signal-to-noise (S/N) ratio.

The preferred data processing algorithm workflow includes automated georeferencing, diurnal correction, heading error correction, dropout/spike removal and interpolation, anomalous field detection with IGRF model, reduction-to-pole, automated production of contouring interpretive maps, and false flag removal The preferred UAV is a gas-electric hybrid hexacopter platform equipped that permits extended flight time limited by fuel capacity, and avoidance of recharging latency. However, other types of UAVs, especially lithium battery electric designs, may be used, where flight duration limitations permit.

A magnetometer sensor comprising two total field magnetometers that can collect data at a sample rate of 1000 Hz and a sensitivity of 1 pT/Hz is provided in a suspended sensor pod. The pod also includes a global navigation satellite system (GNSS) receiver. The sensor pod is housed in a non-magnetic, light, and durable enclosure case, especially manufactured for this purpose. The magnetometer system is tethered to the UAS with thin, strong, and flexible polypropylene rope braided poly cord at a 4 m fixed offset.

A UAV-based aeromagnetic survey system was designed, developed and tested to autonomously detect and identify abandoned and unmarked oil and gas wells in an area of historical hydrocarbon exploration. Prior work developed a system for detecting unexploded ordnance, but operated in environments where vertical obstructions were not a particular issue, and thus height control could be regulated without substantial object avoidance issues.

The magnetics data undergoes a standardized processing routine to highlight anomalies associated with well casings and dim other anthropogenic magnetic anomalies. The process includes, for example, a process as follows:

1. Raw data files are parsed by downsampling from 1000 Hz to 1 Hz and attached to the GNSS data, which contains time, latitude northing, longitude westing, and altitude information. (If the GNSS data update rate is increased, the downsampling is altered accordingly.)

2. Anomalous dropouts related to sensor errors, or polar dead zones, are removed.

3. The total field magnetic datasets are diurnally corrected with the aid of a magnetic base station at $\frac{1}{15}$ Hz. Heading errors of up to 15 nT in the raw total magnetic field data can be seen as large stripes, and are corrected with a statistical line leveling algorithm.

4. The 12th generation International Geomagnetic Reference Field (IGRF) regional total magnetic field values are calculated for the date, location, and elevation of surveys in order to determine the residual total magnetic intensity (TMI).

5. These point data are converted to a raster grid of 5 m pixels using kriging interpolation. (en.wikipedia.org/wiki/Kriging)

6. The raster grid is low-pass filtered using a 3×3 unweighted moving average kernel convolution. (waterprogramming.wordpress.com/2018/09/04/implementation-of-the-moving-average-filter-using-convolution/; en.wikipedia.org/wiki/Moving average)

7. The effect of the local geomagnetic-field direction at the survey location is removed with a reduction to the pole filter (RTP) to create a TMI RTP raster.

8. A final TMI RTP map of 5 nT contours is created to locate the peak amplitudes of potential wells and plotted over a topographic map to deliver to stakeholders.

The present system allows definitive detection of magnetic anomalies associated with metal casing of vertical wells, pronounced considerably above background levels both at the surface and up to 50 m above-ground elevation, considerably above the maximum height of the tree line. The system allows rapid identification and subsequent remediation of unmarked wells, in turn allowing for future sustainable development of these areas.

In a proof of concept study by the inventors, magnetic anomalies associated with the metal casing of abandoned vertical gas wells were demonstrated t be detectable in unmanned aerial vehicle (UAV) aeromagnetic surveys collected at an altitude slightly above the regional treeline (Nikulin and de Smet, 2019). The results suggest that total magnetic intensity anomalies created by well casings are several hundred nT at 40 m above ground level. As a result, the geophysical targets created by well casings are much greater than background geology and appear as bulls-eye responses in interpolated raster maps. The methodology was adapted for wide area autonomous search-and-identify survey missions and processing and analysis algorithms created specifically calibrated to identify and classify abandoned oil and gas wells with high certainty, mapped as contoured anomalies on topographic maps. These maps can be used to provide land managers and other stakeholders with accurate location information to help plug orphaned and abandoned oil and gas wells anywhere in the world. Field trials conducted in close collaboration with the NYS DEC demonstrated that automated UAV aeromagnetic surveys are more operationally and cost-efficient than both terrestrial and piloted aeromagnetic surveys to detect and map orphaned and abandoned oil and gas wells.

One of the limiting factors of Nikulin and de Smet (2019) was the relatively short total flight time allowed by the battery-powered unmanned aerial system (UAS) used in the initial aeromagnetic surveys over the known experimental well site. The present technology for wide-areas UAS surveys permit magnetic data to be collected by a gas-electric hybrid hexacopter platform, equipped with a magnetometer sensor. The magnetometer system is housed and protected, in a pod which includes the global navigation satellite system (GNSS) receiver, in a non-magnetic, light, and durable enclosure case, especially manufactured for this purpose. The magnetometer system consists of two total field magnetometers that can collect data at a sample rate of 1000 Hz and a sensitivity of 1 pT/Hz. The magnetometer array was tethered to the UAS with thin, strong, and flexible polypropylene rope braided poly cord at a 4 m fixed offset.

A hybrid gas electric UAV was calibrated to execute wide-area missions at 7 m/s at an altitude of 40 m with line spacing of 20 m. This allowed design of missions that covered ~100 acres in a single 1-hour flight while maintaining visual line of sight to the UAV, as required by FAA 107 regulations. Additionally, a fixed forward-looking visible-light camera was used to monitor potential obstacles along the flight path in addition to visual control of the UAV by the remote pilot-in-command. The hybrid UAV is equipped with real time kinematic (RTK) global positioning system (GPS) modules allowing autonomous low-altitude data collection along densely spaced grid lines. Increased endurance and preserved instrument sensitivity, coupled with low flight altitudes, allowed for the same high survey density as with a conventional battery-powered UAV, but the extended flight times offered by the hybrid UAV platform significantly expanded the survey area and allow uninterrupted surveying, eliminating the need for post-processing to merge and calibrate surveys collected at different times. This mission scope could be further expanded in terms of flight time and aerial coverage and remains constrained by the line-of-sight rules imposed on small UAS operators by the US Federal Aviation Administration.

GNSS-guided autonomous missions are pre-programmed, where waypoint navigation allows the UAS and magnetic sensors to maintain constant altitude. Data is collected at an altitude of 45 m AGL, spaced 20 m apart. Missions are flown at a speed of 7 m/s in three 600×600 m grids and over 60 line-kilometers of magnetic data are collected during each survey (FIG. 6). That is, each 600×600 m grid has over 20 line-kilometers of magnetic data. A fixed forward looking visible-light camera is used to monitor potential obstacles along the flight path in addition to visual control of the UAS by the pilot-in-command.

In some instances, the camera may be part of an automated flight control system, which fuses sensor data from GPS, LiDAR (e.g., Velodyne), camera, etc. The flightpath is controlled to provide the UAS moving along a north-south magnetic line, with a height controlled with the sensors between 30-50 meters, preferably 33-45 meters. A constant height is preferred, but tall vegetation may impede this. The Digital Object Model provides a reference surface and vegetation height, however, the data is often stale or inaccurate due to changes since the last survey. A real-time LiDAR may therefore be employed to verify and/or correct the height of the UAS and the suspended pod. Note that while the flight plan typically provides a height that avoids obstacles, the real-time sensor may also reveal that a pre-existing obstruction is absent, and therefore a planned height deviation is unnecessary.

While the raw aeromagnetic datasets reveal some of the larger anthropogenic anomalies, there are considerable errors and artifacts introduced to the datasets as a result of sensor motion and diurnal magnetic field variations.

The UAS-based magnetics data undergoes a standardized processing routine to highlight anomalies associated with well casings and dim other anthropogenic magnetic anomalies. Initially, raw data files are parsed by downsampling from 1000 Hz to 1 Hz and attached to the GNSS data at that same rate, which contains time, latitude northing, longitude westing, and altitude information. Next, anomalous dropouts related to sensor errors, or polar dead zones, are removed. The total field magnetic datasets are diurnally corrected with the aid of a magnetic base station at $\frac{1}{15}$ Hz. Heading errors of up to 15 nT in the raw total magnetic field data which can be seen as large stripes are corrected with a line leveling algorithm. The 12th generation International Geomagnetic Reference Field (IGRF) regional total magnetic field values are calculated for the date, location, and elevation of our surveys in order to determine the residual total magnetic intensity (TMI). These point data are then converted to a raster grid of 5 m pixels using kriging interpolation. The raster grid is low-pass filtered using a 3×3 unweighted moving average kernel convolution. The effect of the local geomagnetic-field direction at the survey location is removed with a reduction to the pole filter (RTP) to create a TMI RTP raster. A final TMI RTP map of 5 nT contours is created to locate the peak amplitudes of potential wells and plotted over a topographic map to deliver to stakeholders.

FIG. 13 reflects an understanding of where noise comes from, its structure, and whether it is coherent or incoherent is extraordinarily important and can be used to design a better platform and methods of data acquisition as well as help process out unwanted signals with bandpass filters. Understanding where noise comes from and whether it is coherent or incoherent is extraordinarily important and can be used to design a better platform and methods of data acquisition as well as help process out unwanted signals with bandpass filters. The β slope of a power-law shaped spectral is a quantitative measure of the heterogeneity of the signal and spatial dependence. Generally higher $|\beta|>1$ values indicate long-range correlations, whereas $\beta=0$ indicates pure white noise, and $\beta \sim 0.5$ indicates fractional Gaussian noise.

It is therefore an object to provide a unmanned aerial system, comprising: a video camera, disposed on a Unmanned Aerial Vehicle (UAV) and configured to view an obstruction ahead of the UAV; an above-ground level sensor, configured to determine an above-ground level of the UAV during flight; and an automated control for the UAV, configured to control the UAV according to a flight plan at a predetermined above-ground level having an altitude of less than 50 meters, with a vertical deviation from the predetermined above-ground level dependent on at least the viewed obstruction ahead of the UAV and a predetermined Digital Obstacle Model (DOM) representing a computational model of obstacles for the UAV at the above-ground level prior to flight.

It is also an object to provide a UAV, comprising: a forward looking sensor configured to detect an obstacle; and an automated control for the UAV, configured to control the UAV according to a flight plan with a deviation from the flight plan dependent on the detected obstacle and a predetermined Digital Obstacle Model (DOM) representing a predetermined computational model of obstacles for the UAV according to the flight plan.

It is a further object to provide a method for surveying a region, comprising: providing an Unmanned Aerial Vehicle (UAV), comprising: a video camera, disposed on a UAV and configured to view an obstacle ahead of the UAV; an above-ground level sensor, configured to determine an above-ground level of the UAV during flight; a survey sensor, configured to sense a proximate environmental parameter; and an automated control, configured to control the UAV according to a flight plan at a predetermined above-ground level having an altitude of less than 50 meters, subject to a vertical deviation from the predetermined above-ground level dependent on at least the viewed obstacle ahead of the UAV and a predetermined Digital Obstacle Model (DOM) representing a computational model of obstacles for the UAV at the above-ground level prior to flight; flying the UAV according to the predetermined flight plan, at the predetermined above-ground level, while monitoring the video camera for the obstacle ahead of the UAV; and receiving geotagged data from the survey sensor concurrently with said flying.

The system may further comprise a survey sensor, configured to generate survey data. The survey sensor may comprise a magnetometer. The survey sensor may comprise at least two microfabricated atomic magnetometers.

The system may further comprise a remote control station, configured to communicate with the automated control.

The system may further comprise at least one of a Digital Surface Model (DSM) and a Digital Elevation Model (DEM), wherein the DOM is dependent on the at least one of the DSM and the DEM.

The system may further comprise a Global Navigation Satellite System (GNSS), and a survey sensor, wherein survey sensor readings are associated with GNSS-determine geolocation.

The system may further comprise an autonomous guidance system, responsive to the viewed obstruction ahead of the UAV, configured to perform an avoidance maneuver based on the viewed obstruction. The UAV may comprise an internal combustion engine power source. The UAV may have a maximum continuous flight time exceeding one hour, two hours, or two and a half hours. The UAV may have a hybrid power source comprising an internal combustion engine and an electric generator, powering a plurality of electric motors providing lift. The system may include the UAV, or be provided as an addition to a UAV system. The UAV may be a hexacopter.

The system may further comprise a magnetometer within a housing, suspended below the UAV during flight.

The method may further comprise automatically controlling the UAV dependent on communications with a remote control station The flight plan may dependent on a Digital Surface Model (DSM). The flight plan may be dependent on a Digital Elevation Model (DEM).

The UAV may comprise a Global Navigation Satellite System (GNSS), and wherein survey sensor readings are associated with GNSS-determine geolocation and the UAV is guided according to the flight plan dependent on the GNSS.

The method may further comprise autonomously guiding the UAV, responsive to the viewed obstacle ahead of the UAV, and autonomously performing an avoidance maneuver based on the viewed obstacle.

The UAV may have a maximum continuous flight time exceeding 60, 120 or 140 minute.

The method may further comprise correcting the sensed proximate environmental parameter for a diurnal variation.

The UAV may have a hybrid power source comprising an internal combustion engine and an electric generator, powering a plurality of electric motors providing lift.

The survey sensor may be provided within an housing, suspended below the UAV during flight.

The above-ground level may be 40 meters or less. The above-ground level sensor may comprise a LiDAR.

The survey sensor may comprise at least two separated magnetometers, having a sensitivity of at least 1 pT/Hz, configured to sense magnetic objects at a distance of between 30-50 meters.

The flight path may comprise a serpentine sequence of magnetic north-south traverses.

The predetermined Digital Obstacle Model (DOM) may be derived from a Digital Surface Model (DSM) and a Digital Elevation Model (DEM). The DOM may comprise at least one obstacle along the flight path taller than the above ground level. The obstacle may comprise a tree.

Magnetic sensor outputs from the at least two separated magnetometers may be received, synchronized with geographic location data, compensated for diurnal ambient magnetic field variations.

The method may comprise detecting at least one well having a magnetic well casing.

The survey sensor may acquire data at a resolution of less than 7 meters, 4 meters, 3 meters, 2.5 meters, 2 meters, or 1 meter. The survey sensor may comprise a magnetometer suspended below the UAV by about 3 or 4 meters.

Data from the survey sensor may be downsampled to about 1, 2, 3, 4, or 5 Hz, and concurrent GNSS data appended to a data record.

Dropouts related to at least one of sensor errors and polar dead zones may be removed.

Total field magnetic datasets from the survey sensor may be diurnally corrected with data from a magnetic base station. Heading errors may be corrected with a statistical line leveling algorithm. A residual total magnetic intensity (TMI) may be determined. TMI may be converted to a raster grid using kriging interpolation. The raster grid may be low-pass filtered using an unweighted moving average kernel convolution. The effect of a local geomagnetic-field direction may be removed with a reduction to the pole filter (RTP) to create a TMI RTP raster. A TMI RTP map may be created to locate the peak amplitudes, and plotting the peak amplitudes over a topographic map. The topographic map may show locations of abandoned wells, unexploded ordnance, a pipe, and/or an anthropogenic magnetic anomaly.

A set of proximate environmental parameters from a survey flight of the UAV over a parcel may be processed according to a supervised trained algorithm to identify predetermined features corresponding to labelled features of a set of training data for the supervised trained algorithm. The training data comprises labelled unexploded munitions, labelled abandoned wells, and/or anthropogenic magnetic anomalies.

The use of the digital obstruction model and real-time obstruction sensor permits the UAV to fly at a height near the average tree height, well below a safe altitude for a manned helicopter or airplane, while permitting high data acquisition rates permitting efficient aerial surveys of parcels. While DSMs and DEMs are known, typically a flightplan based on such models seek to provide a margin of safety for all predetermined obstructions, and do not contemplate establishing a flightplan that includes likely obstructions and real-time sensor guided obstruction avoidance.

DETAILED DESCRIPTION OF THE INVENTION

Example 1 Detection of Well Heads

In the proof of concept study, magnetic datasets collected by a commercially-available battery-powered DJI-Matrice600 hexacopter UAV, equipped with a Geometrics Microfabricated Atomic Magnetometer (MFAM) sensor were employed, over a known Butkowsky 1-A abandoned well location near Binghamton, N.Y. The well was drilled to a total depth of 10150 ft in 2003 and plugged and abandoned in 2017; the well pad was subsequently leveled and at the time of the study area was overgrown with light vegetation that obscures any visible evidence of well presence. A series of terrestrial and UAV aeromagnetic surveys were conducted over the well site to record the magnetic expression of the well at the ground surface and at altitude, and calculated the rate of magnetic anomaly dissipation with altitude. Initially, using a standard terrestrial survey design and a, the magnetic anomaly associated with the well was observed, which was ~18,000 nT at 0.15 m AGL. The UAV equipped with the MFAM sensor was positioned at the center of the magnetic anomaly and the assembly elevated at a rate of 1 m/s to an altitude of 100 m AGL. The magnetic anomaly at 40 m AGL, which correlated to an elevation slightly above the treeline, was ~400 nT, nearly double the background magnetic field levels at that elevation and the signal dissipated to background levels at ~50 m. Thus, at ~40 m AGL, magnetic anomalies associated with vertical wells featuring metal casing remain pronounced above background levels, allowing their identification in wide-area UAV aeromagnetic surveys.

Figure 1:
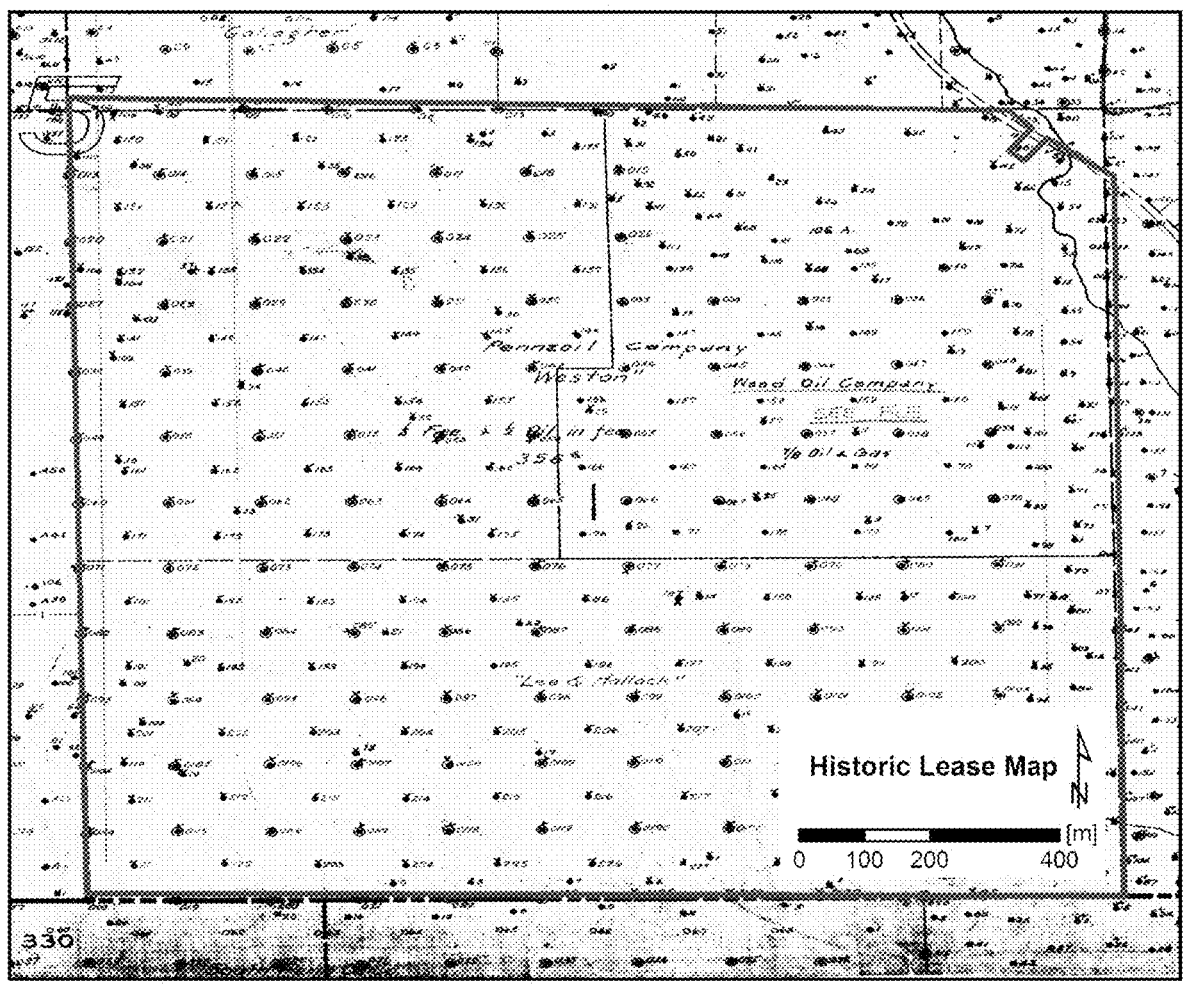
FIG. 1 shows a georeferenced Pennzoil Lease Map, Olean, N.Y. Outline is three-quarter mile shapefile boundary of the survey parcel.
Figure 14:
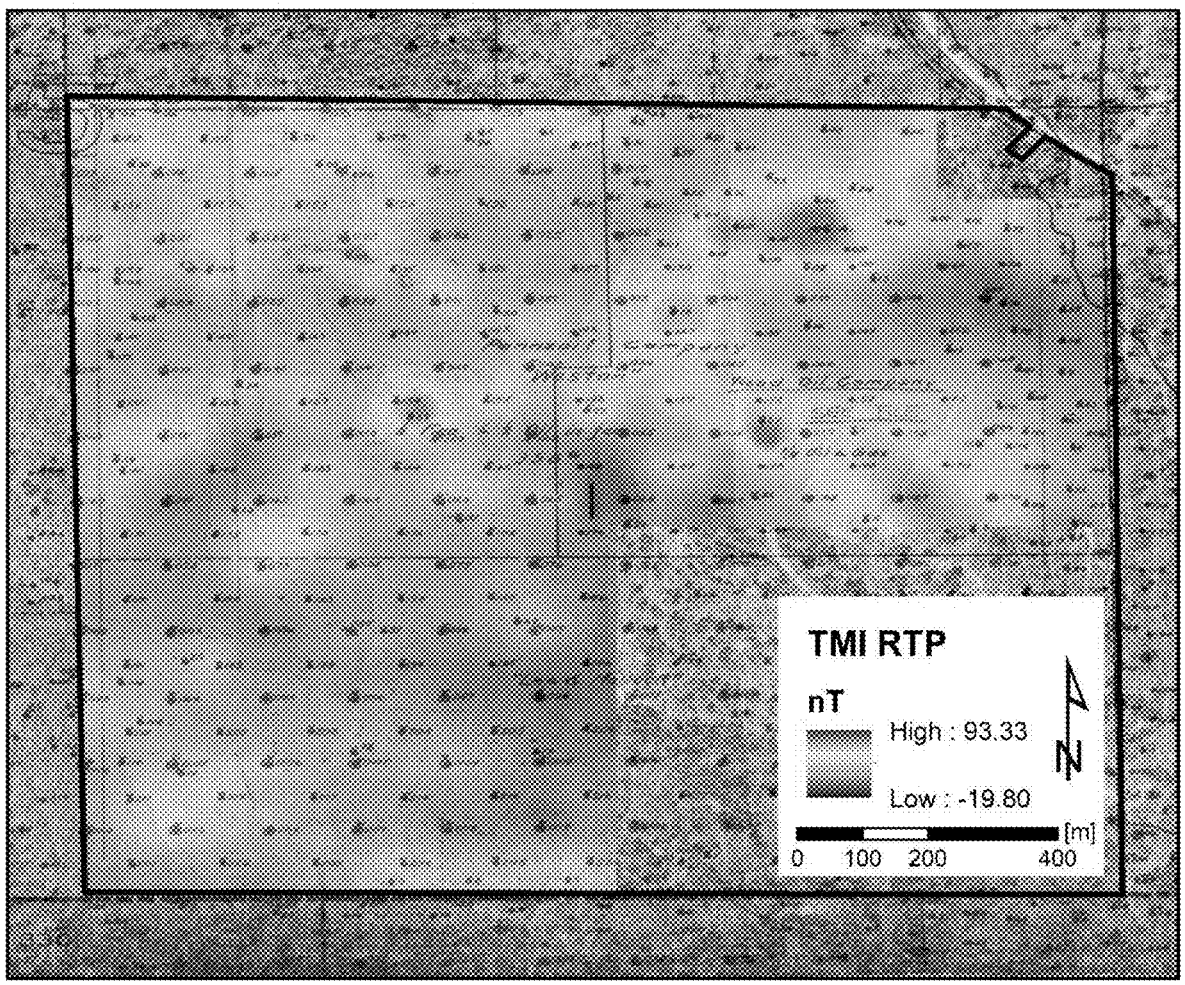
FIG. 14 shows a georeferenced map with TMI RTP.
Figure 15:
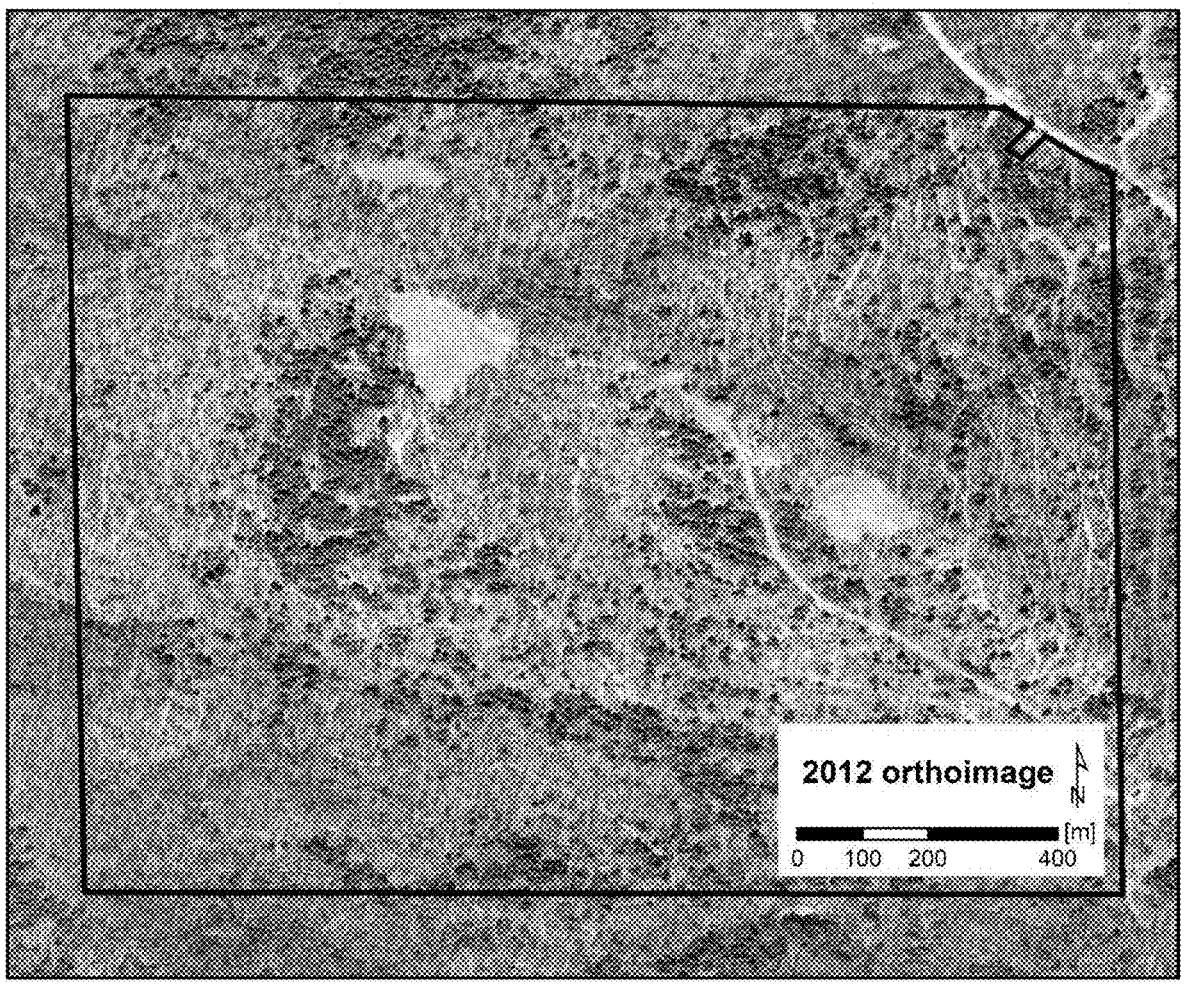
FIG. 15 shows a two-foot orthoimagery from 2012 over the survey area parcel shapefile outlined in black.
Figure 16:
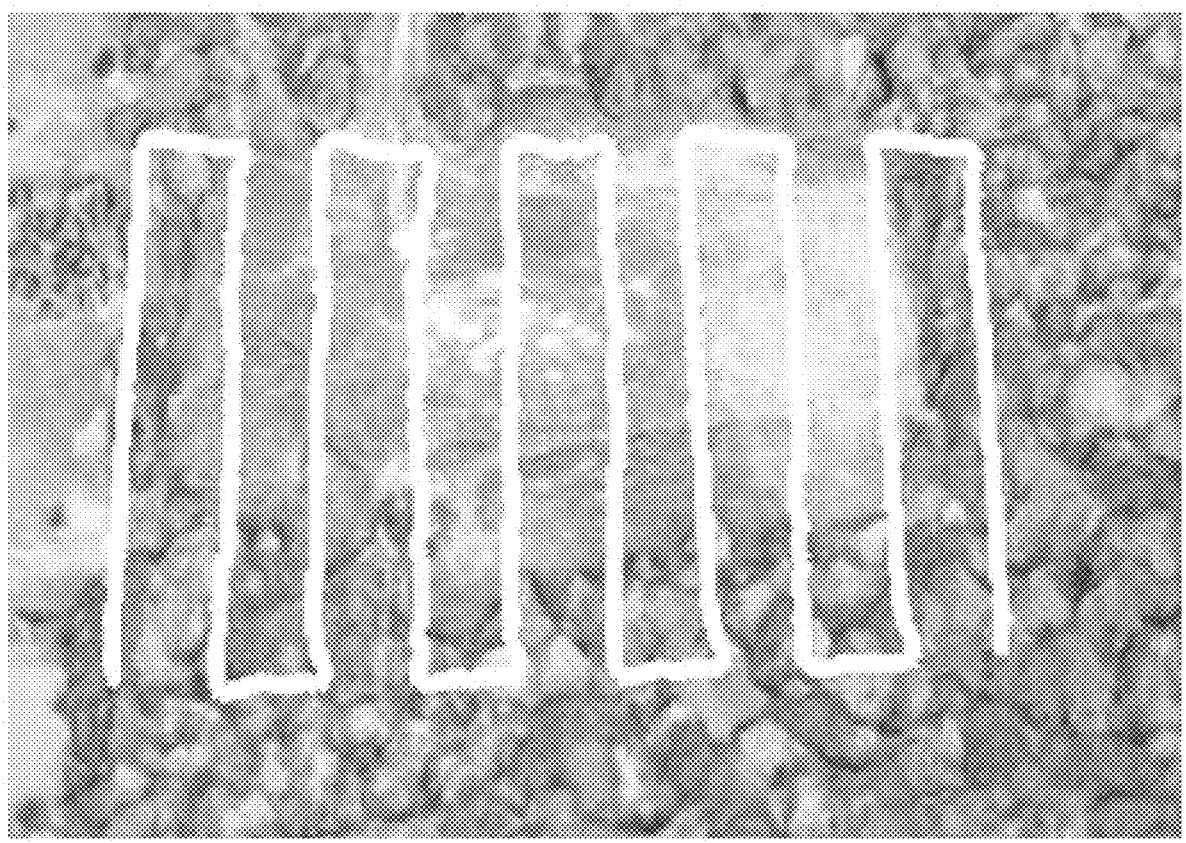
FIG. 16 shows magnetometry data collected at ground height, 10 m, 20 m, and 40 m AGL. Line spacing is 15 m for the aerial trials.
Figure 17A:
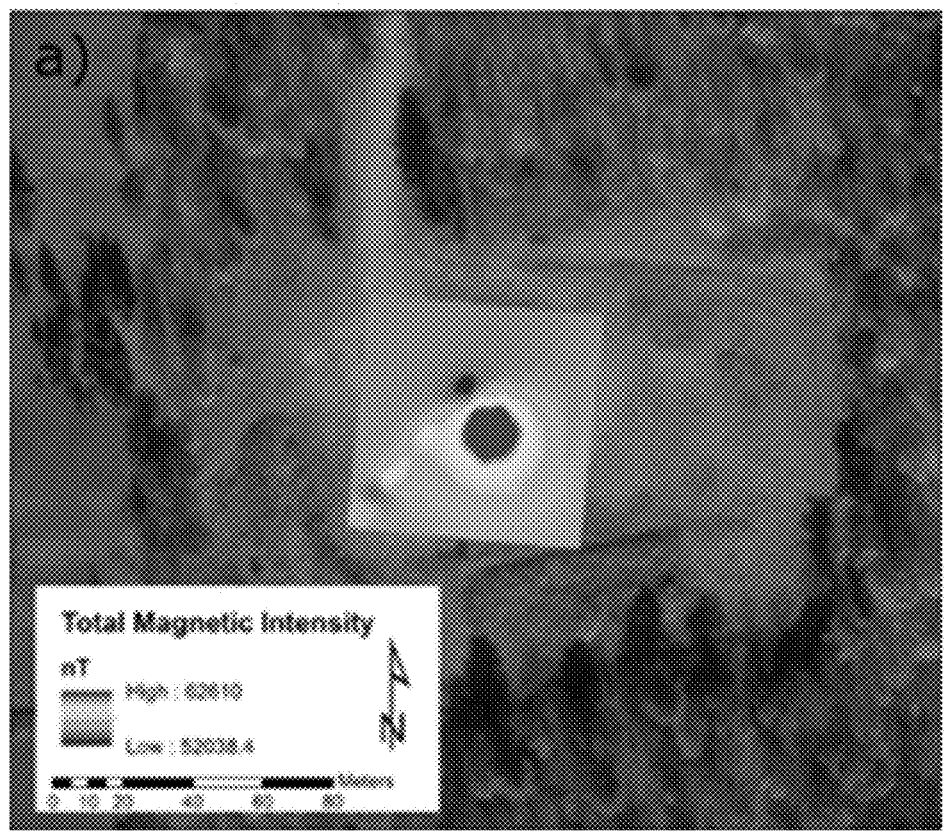
FIGS. 17A and 17B show magnetometry data collected at ground height; A is the magnetics data that the top sensor received, and B is the magnetics data that the bottom sensor received.
Figure 17B:
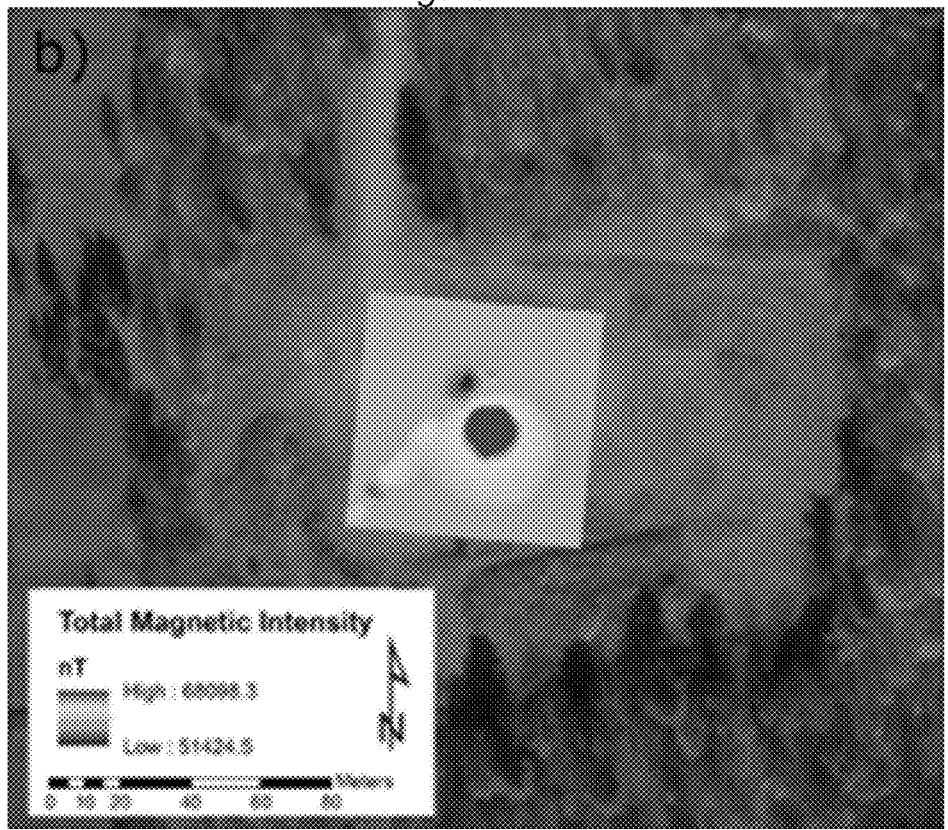
Figure 18A:
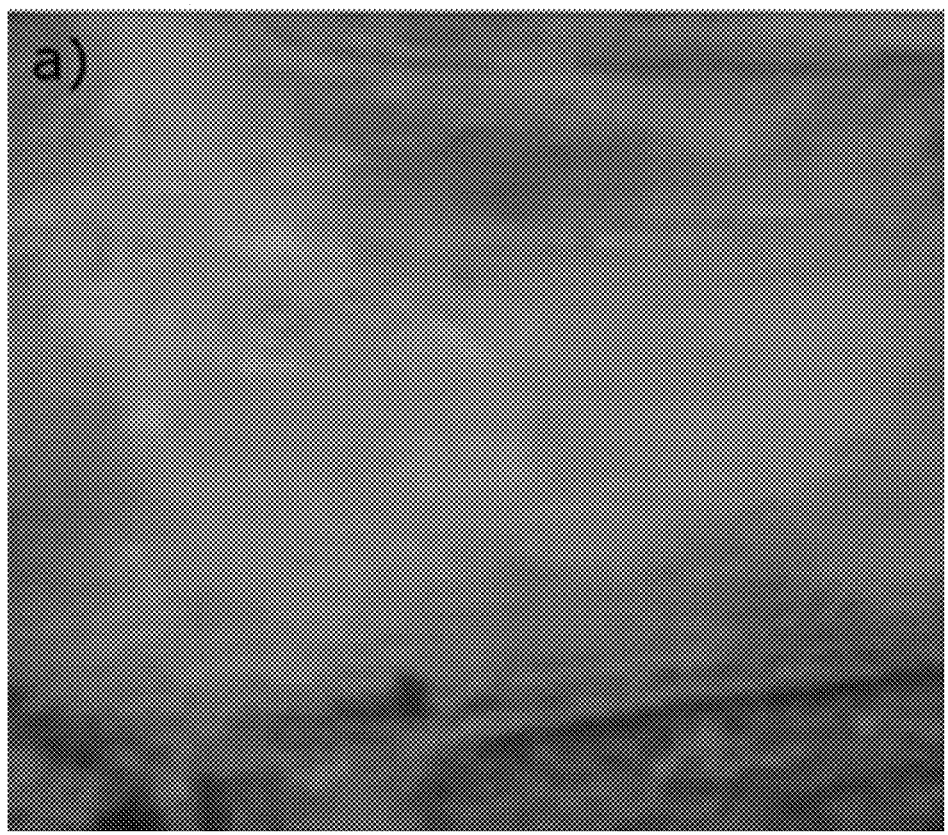
FIGS. 18A and 18B show magnetometry data collected at 10 m AGL.
Figure 18B:
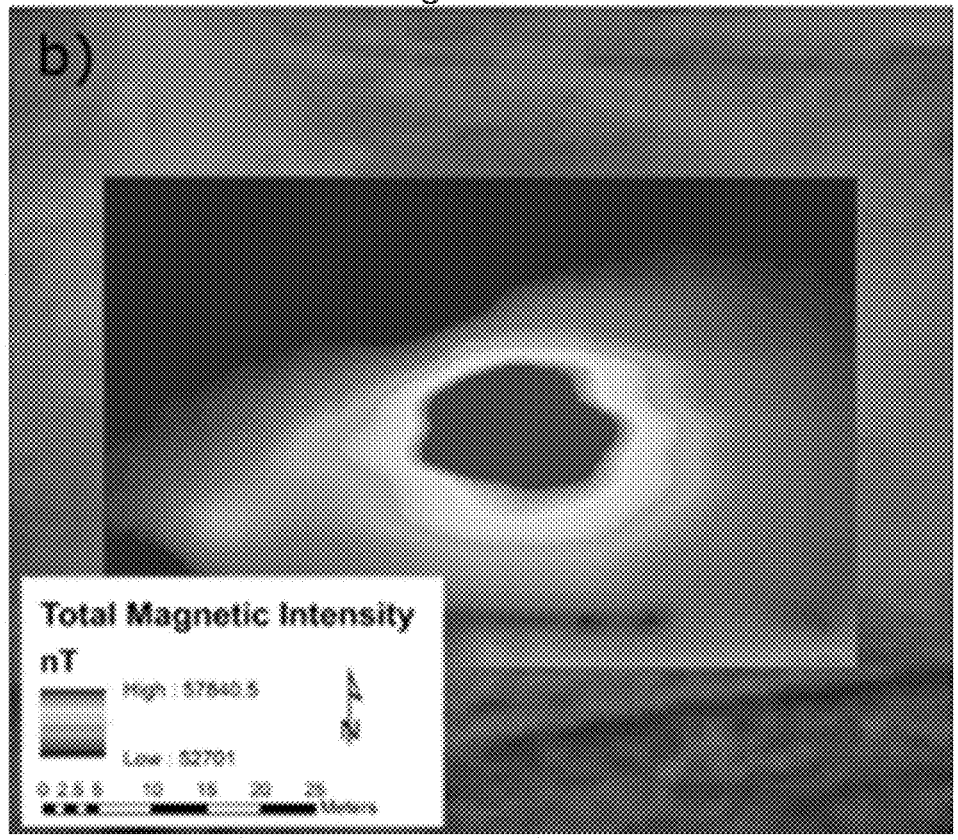
Figure 19A:
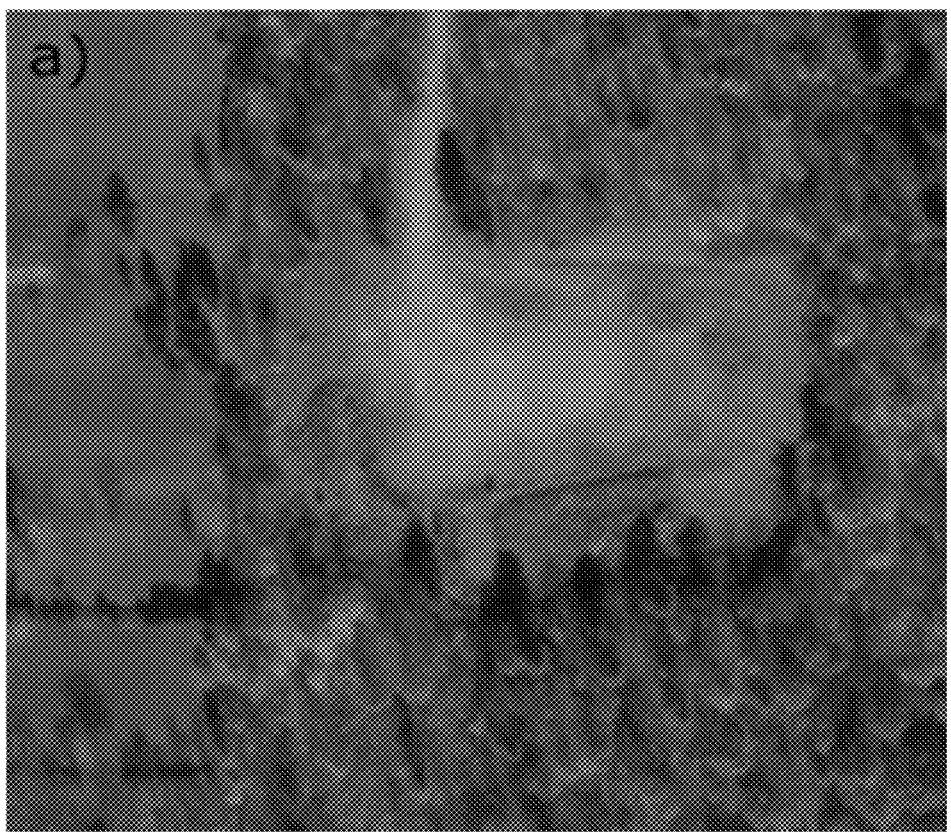
FIGS. 19A and 19B show magnetometry data collected at 20 m AGL.
Figure 19B:
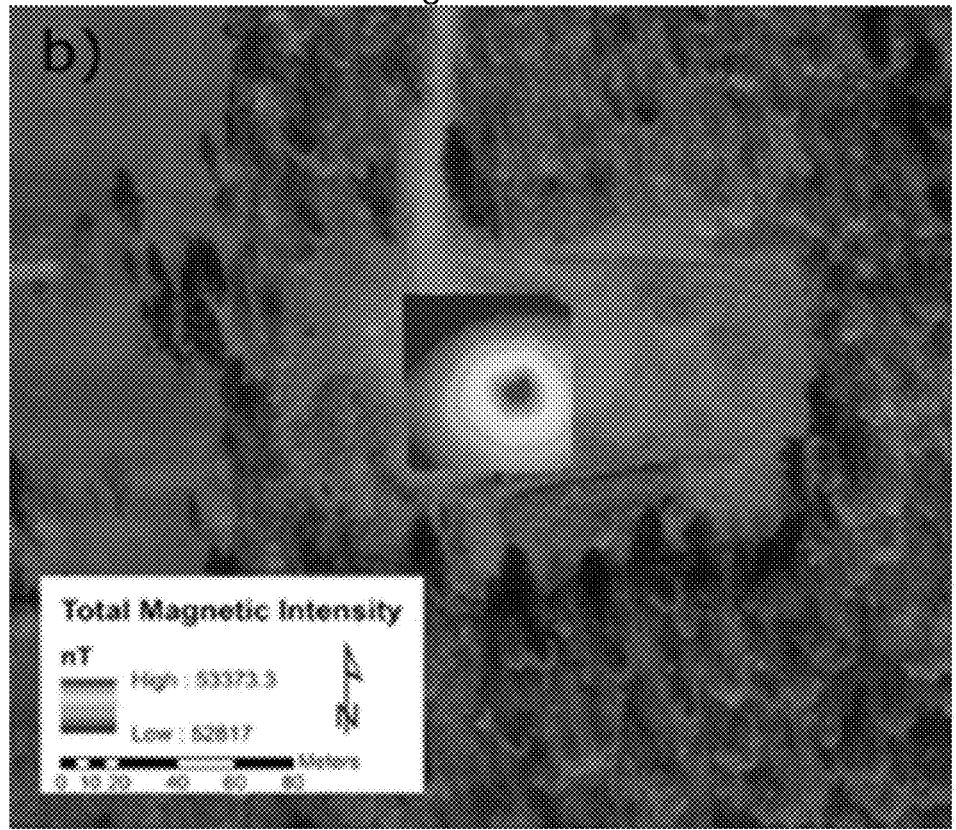
Figure 20A:
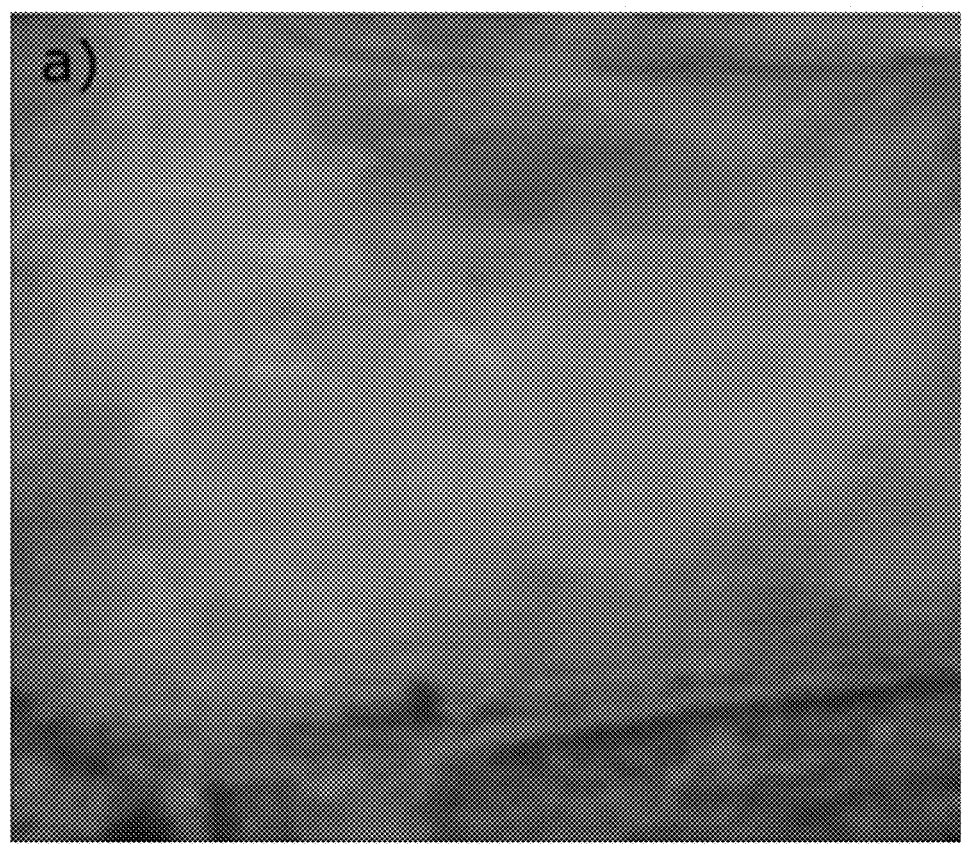
FIGS. 20A and 20B show magnetometry data collected at 40 m AGL.
Figure 20B:
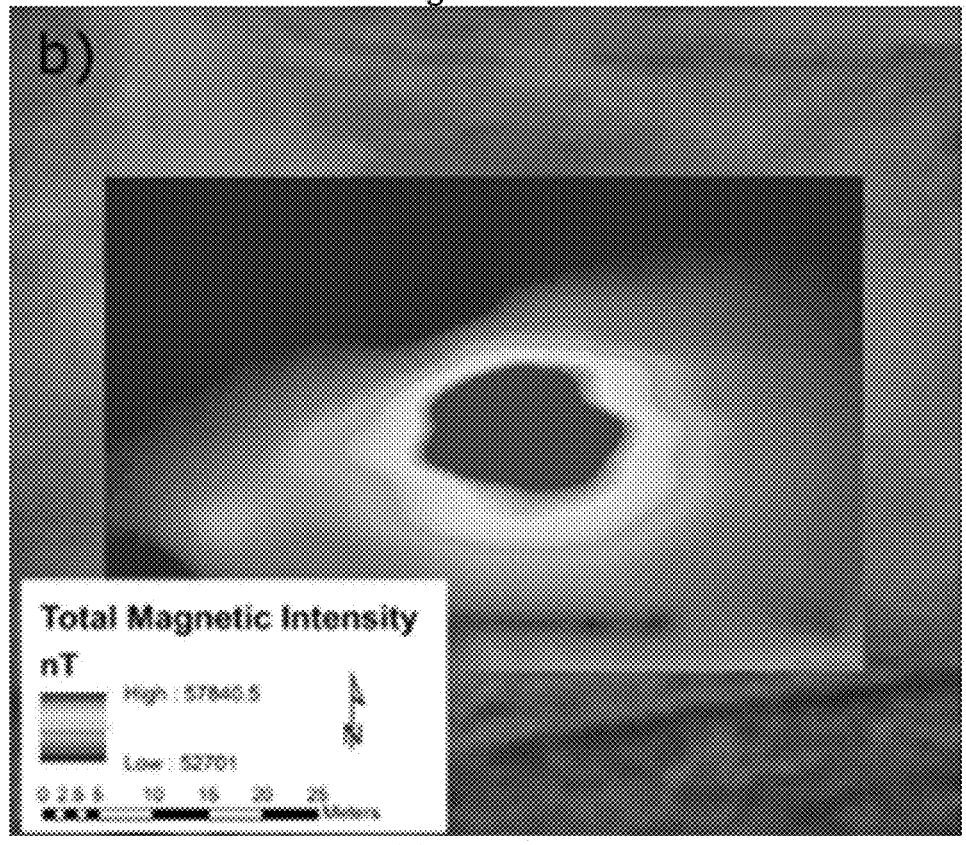

The area chosen for follow-up study was Chattarugas County in Western New York, where wide-spread hydrocarbon exploration and production activity occurred in the late nineteenth and early twentieth century. FIG. 1 shows a georeferenced Pennzoil Lease Map, Olean, N.Y. The outline is a three-quarter mile shapefile boundary of the survey parcel. FIG. 14 shows a magnetic map of the region. FIG. 15 shows a two-foot orthoimagery from 2012 over the survey area parcel shapefile outlined. FIG. 16 shows the path for obtaining magnetometry data collected at ground height, 10 m, 20 m, and 40 m. Line spacing is 15 m for the aerial trials. FIGS. 17A and 17B show magnetometry data collected at ground height. A is the magnetics data that the top sensor received and B is the magnetics data that the bottom sensor received. FIGS. 18A and 18B show magnetometry data collected at 10 m above ground level (AGL). FIGS. 19A and 19B show magnetometry data collected at 20 m above ground level (AGL). FIGS. 20A and 20B show magnetometry data collected at 40 m above ground level (AGL).

Figure 21A:
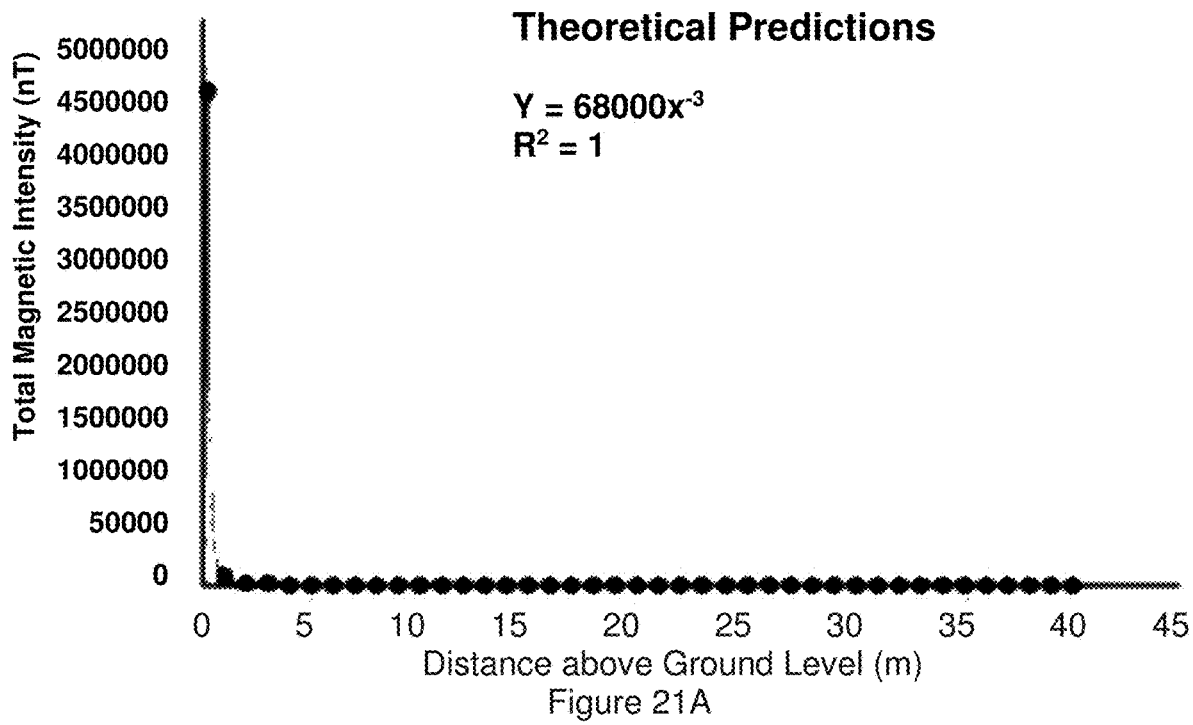
FIG. 21A shows Theoretical Predictions.
Figure 21B:
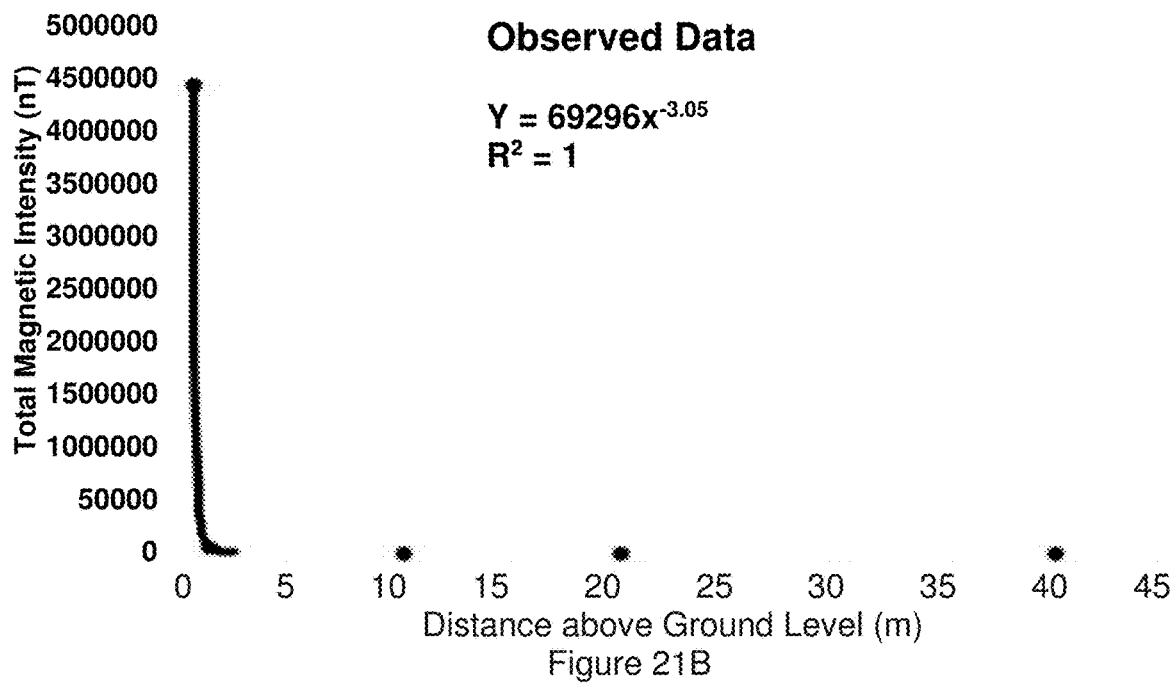
FIG. 21B shows Observed Data.
Figure 22A:
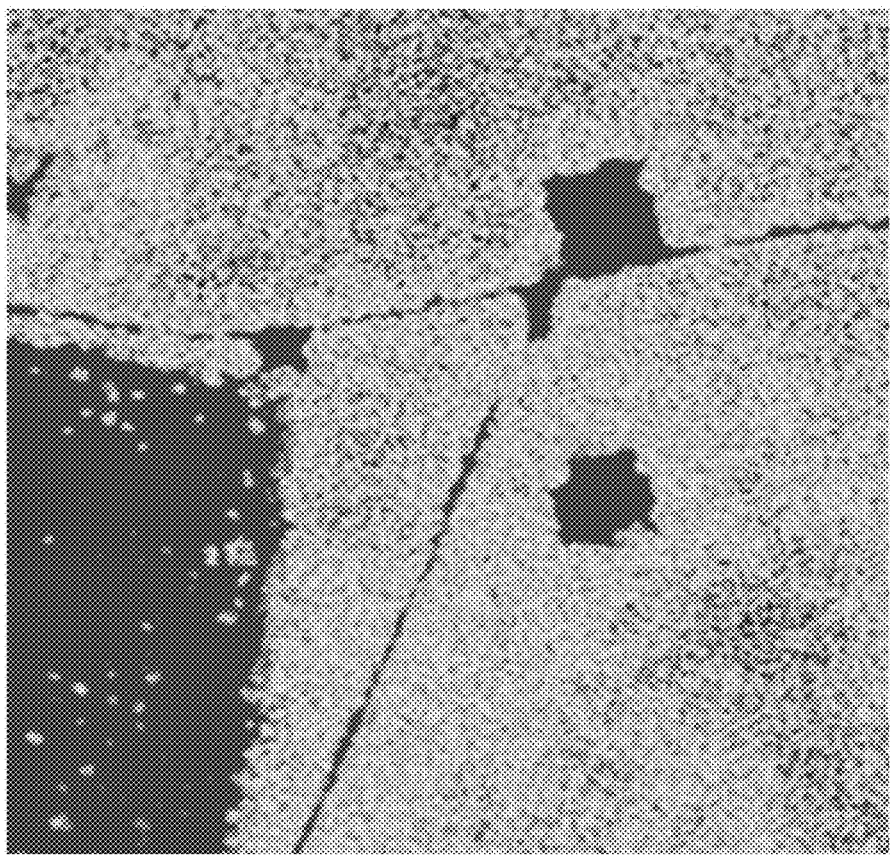
FIG. 22A shows LiDAR data downloaded from FEMA for all three control sites. The vertical derivative of LiDAR data is shown on the left. Red areas show where land has been artificially flattened.
Figure 22B:
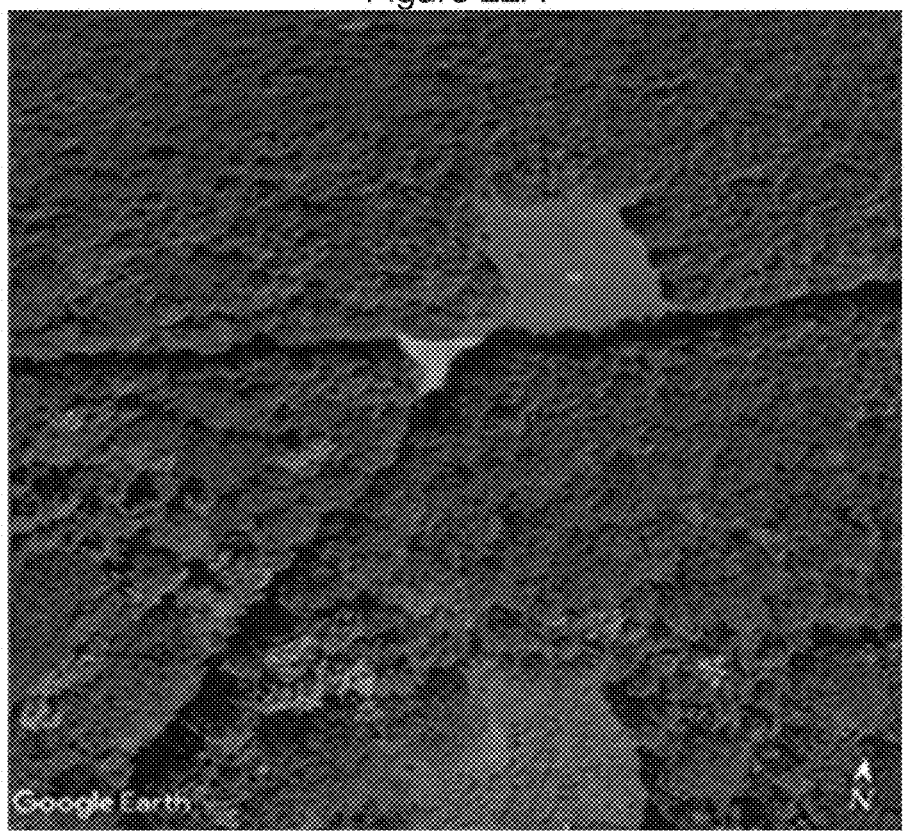
FIG. 22B shows a Google Earth image of the same region.

FIG. 21A shows theoretical predictions and FIG. 21B shows observed data. FIG. 22A shows LiDAR data downloaded from FEMA for all three control sites; the vertical derivative of LiDAR data is shown on the left, and red areas show where land has been artificially flattened. FIG. 22B shows a Google Earth of the same region.

New York State (NYS) has high-resolution 1 m LiDAR data coverage throughout most of the state and the survey area in Cattaraugus County was collected in 2017 by the Federal Emergency Management Agency (FEMA). NYS LiDAR data is available as .las files, which were used to generate post-processed derivative data products such as digital elevation models (DEM, en.wikipedia.org/wiki/Digital_elevation_model) and digital surface models (DSM). A DSM is a 3D digital model of the first returns from LiDAR, which includes all natural and anthropogenic objects, like trees and buildings (FIG. 2, Digital Surface Model (DSM) of survey area in Olean, N.Y., www.gisresources.com/confused-dem-dtm-dsm/, Zhou, Qiming. "Digital elevation model and digital surface model." International Encyclopedia of Geography: People, the Earth, Environment and Technology: People, the Earth, Environment and Technology (2016): 1-17). A DEM encompasses the subsequent returns as well at the earth's surface where vegetation and anthropogenic structures have been removed to produce what is often called a 'bare earth' model (FIG. 3, Digital Elevation Model (DEM) of survey area in Olean, N.Y.). Subtracting the DSM from the DEM produces a critical derivative data product, a digital obstacle model (DOM). The DOM is essential to avoid terrain obstructions while planning low-altitude missions (FIG. 4, Digital Obstacle Model (DOM) of the survey area in Olean, N.Y. and FIG. 5, Google Earth image of preprogrammed autonomous flight path terrain awareness), while the DEM is necessary to maintain constant altitude AGL. Maintaining consistent altitude AGL is of the utmost importance as the earth's total magnetic field rapidly decays at $1/r^3$ and shifts in altitude AGL will result in poor data quality and increase the difficulty in post-processing.

One of the limiting factors of the Nikulin and de Smet (2019) was the relatively short total flight time allowed by the battery-powered UAS used in the initial aeromagnetic surveys over the Butkowsky 1-A well site. In follow-up efforts to adapt the developed methodology to wide-area surveys UAS-based magnetic data were collected by a UMT Cicada gas-electric hybrid hexacopter platform (umt.aero/cicada/) equipped with the MFAM sensor. This UAS weighs 16.5 kg (36.38 lb) and has a maximum takeoff weight of 19 kg (41.89 lb). The MFAM development kit including the global navigation satellite system (GNSS) receiver was housed and protected in a non-magnetic, light, and durable UMT MagPike enclosure case, manufactured for this purpose. The MFAM development kit consists of two total field magnetometers that can collect data at a sample rate of 1000 Hz and a sensitivity of 1 pT/Hz. The MFAM was tethered to the UAS with thin, strong, and flexible polypropylene rope braided poly cord at a 4 m fixed offset. The optimal tether distance was previously determined to maintain the highest signal-to-noise (SN) ratio for UAS-based magnetic data acquisition (Nikulin and de Smet 2019).

Using the high-endurance hybrid UAS platform allowed us to plan wide-area missions that covered ~100 acres in a single 1 hr UAS flight. In fact, this metric could be further expanded in terms of flight time and aerial coverage and remains constrained by line-of-sight rules imposed on small UAS operators by the US Federal Aviation Administration (FAA).

Figure 2:
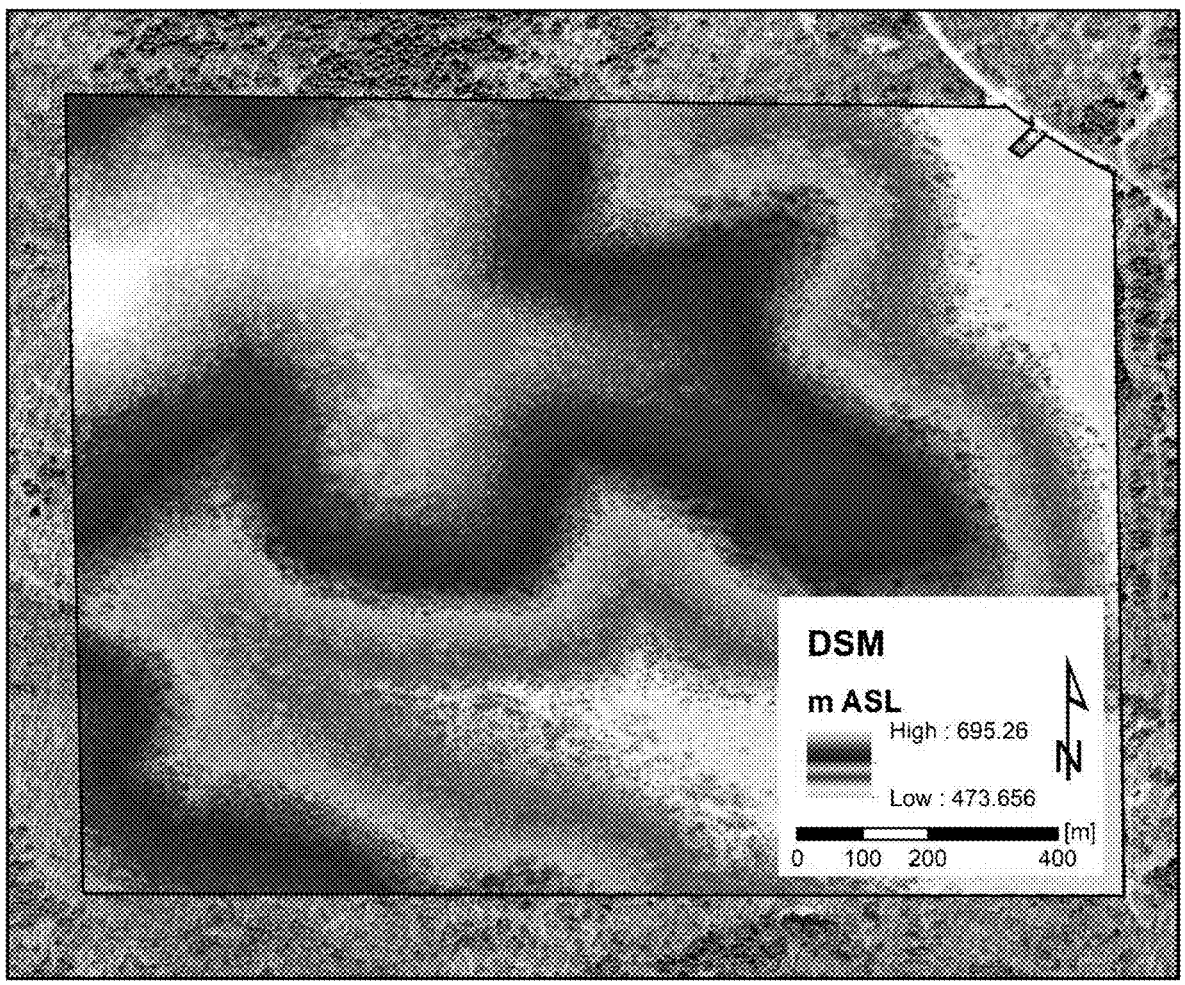
FIG. 2 shows a digital Surface Model (DSM) of survey area in Olean, N.Y.
Figure 3:
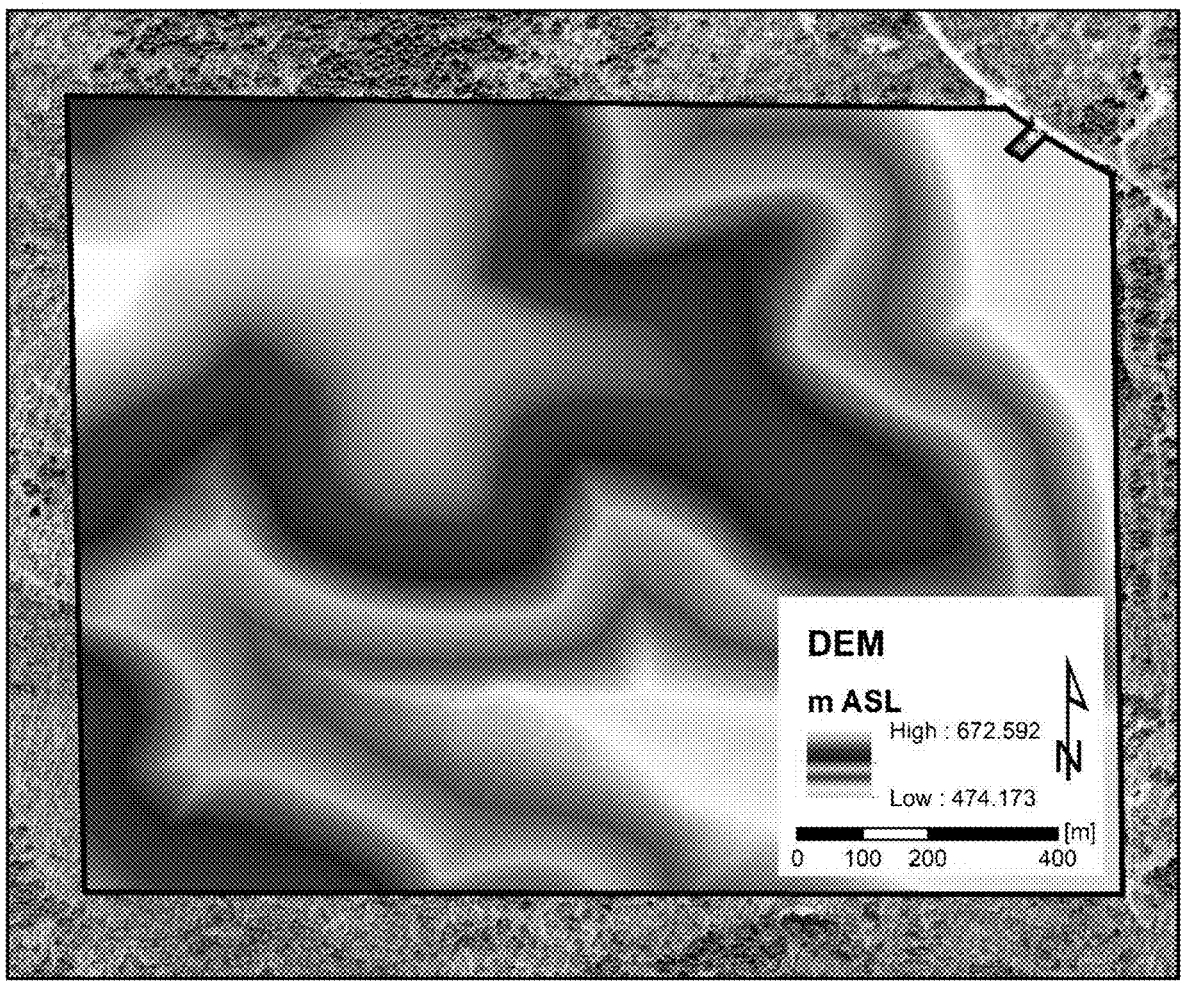
FIG. 3 shows a Digital Elevation Model (DEM) of survey area in Olean, N.Y.
Figure 4:
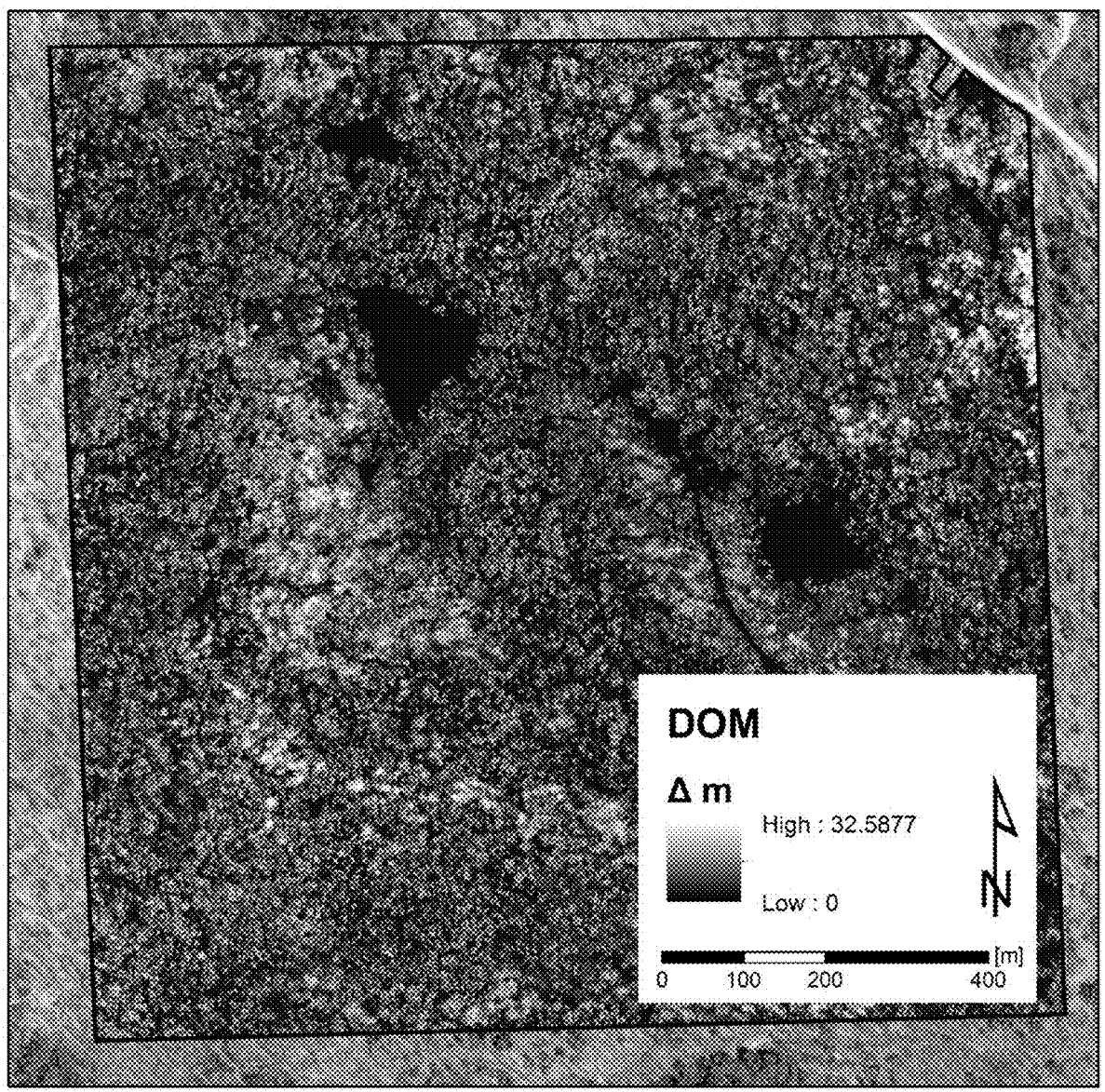
FIG. 4 shows a Digital Obstacle Model (DOM) of the survey area in Olean, N.Y.
Figure 5:
FIG. 5 shows a Google Earth image of preprogrammed autonomous flight path terrain awareness.
Figure 6:
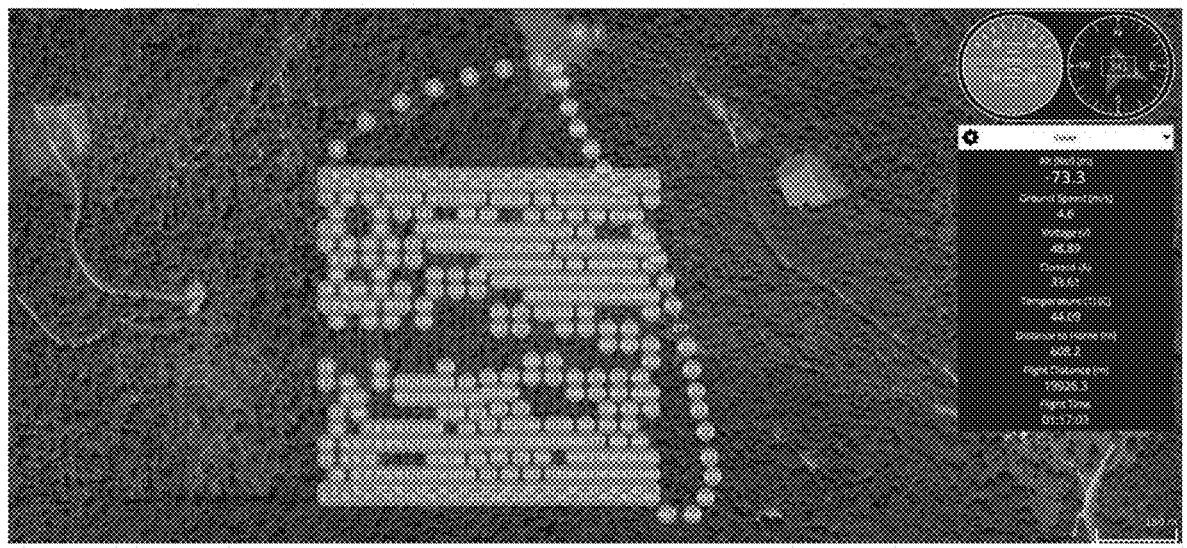
FIG. 6 shows a mission plan with elevation waypoints using QGroundControl. Each 600×600 m survey consisted of between 400-500 waypoints due to the variable topography.
Figure 7:
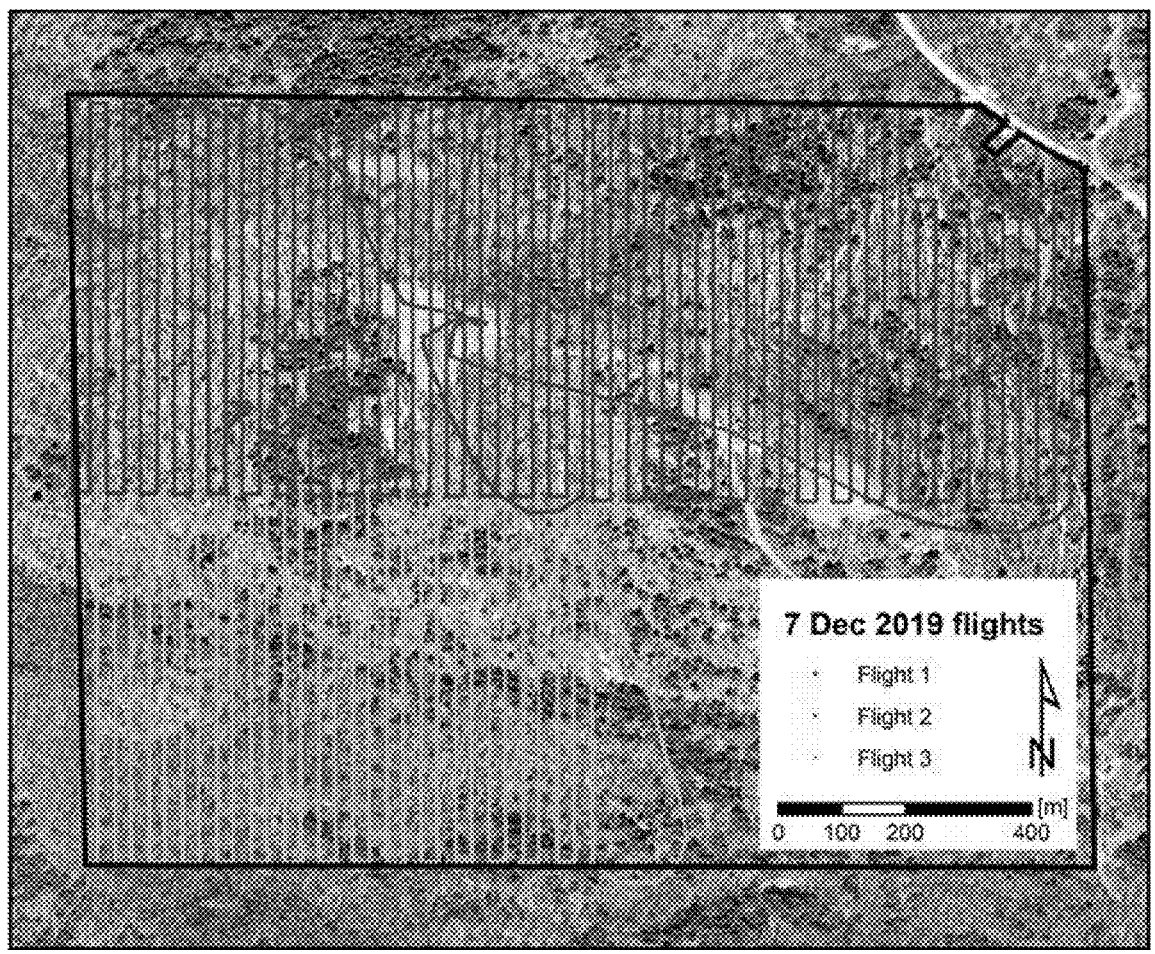
FIG. 7 shows Three 600×600 m missions flown on Dec. 7, 2019.

QGroundControl mission planning software was used to preprogram GNSS-guided autonomous missions where waypoint navigation allowed the UAS and magnetic sensors to maintain constant altitude AGL (FIG. 5). This was critically important as elevation changes in the survey area approached ~200 m (FIGS. 2 and 3). There were ~400-500 waypoints per survey mission depending upon terrain changes specific to the survey (FIG. 6, Mission plan with elevation waypoints using QGroundControl. Each 600×600 m survey consisted of between 400-500 waypoints due to the variable topography). Data were collected at an altitude of 45 m AGL in north-to-south and south-to-north transects spaced 20 m apart. Three missions were flown at a speed of 7 m/s in three 600×600 m grids and over 60 line-kilometers of magnetic data was collected during these surveys (FIG. 7, Three 600×600 m missions). A fixed forward looking visible-light camera was used to monitor potential obstacles along the flight path in addition to visual control of the UAS by the pilot-in-command.

Figure 8:
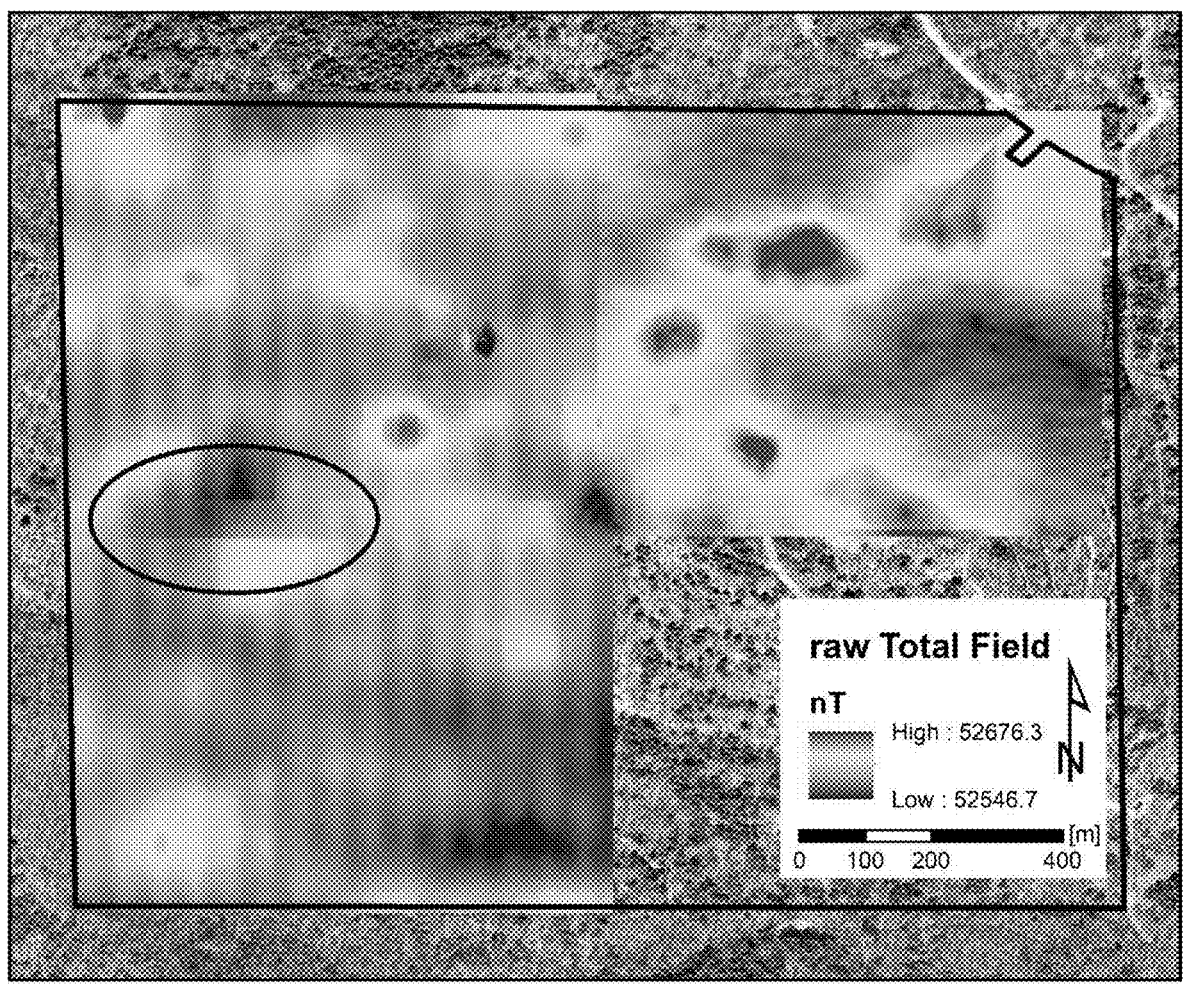
FIG. 8 shows raw uncorrected total magnetic field data. Note the ~15 nT heading errors, and ~10 nT between grid diurnal errors before base station correction. The northeastern portion of the dataset is over interpolated and also needs to be clipped before advanced processing.
Figure 9:
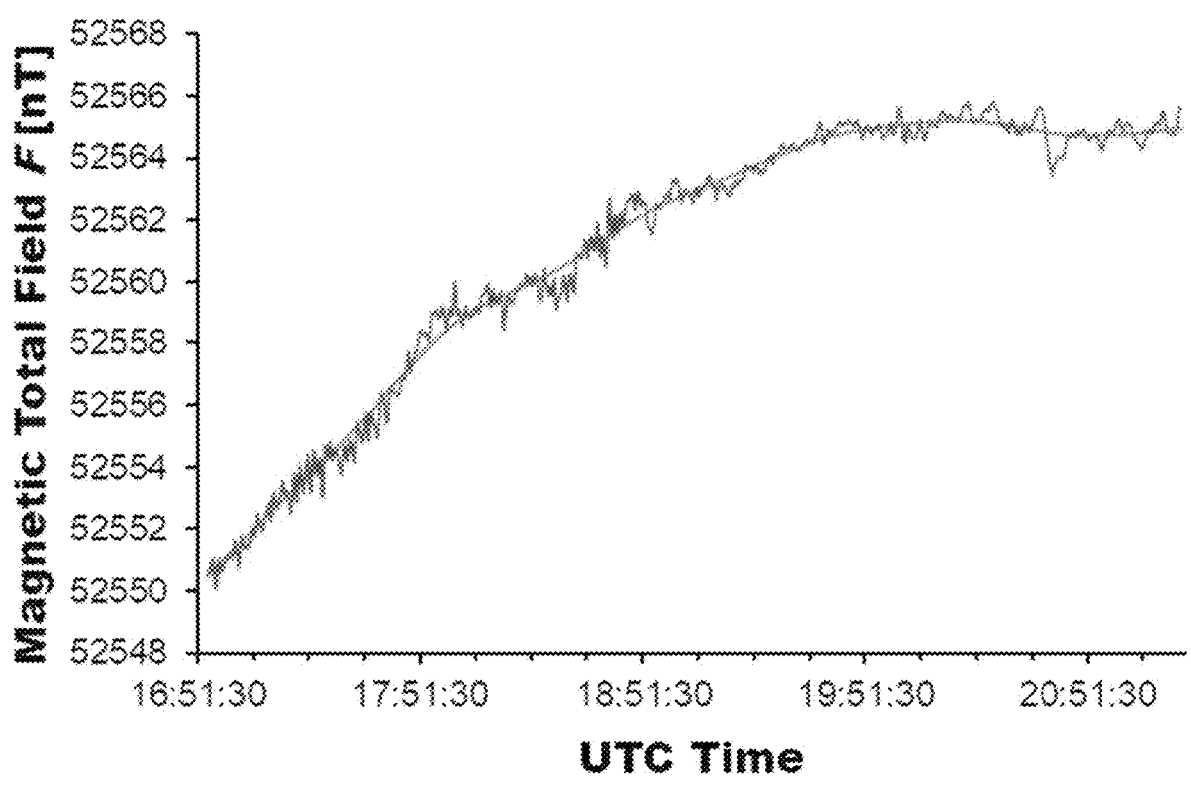
FIG. 9 shows a diurnal variation in magnetic total field intensity recorded at $\frac{1}{15}$ Hz with a Geometrics G-858 magnetometer base station. The total magnetic field intensity F changed by >15 nT throughout the survey. Raw data in red and data smoothed over a 3-minutes (13 point) moving average in blue.
Figure 10A:
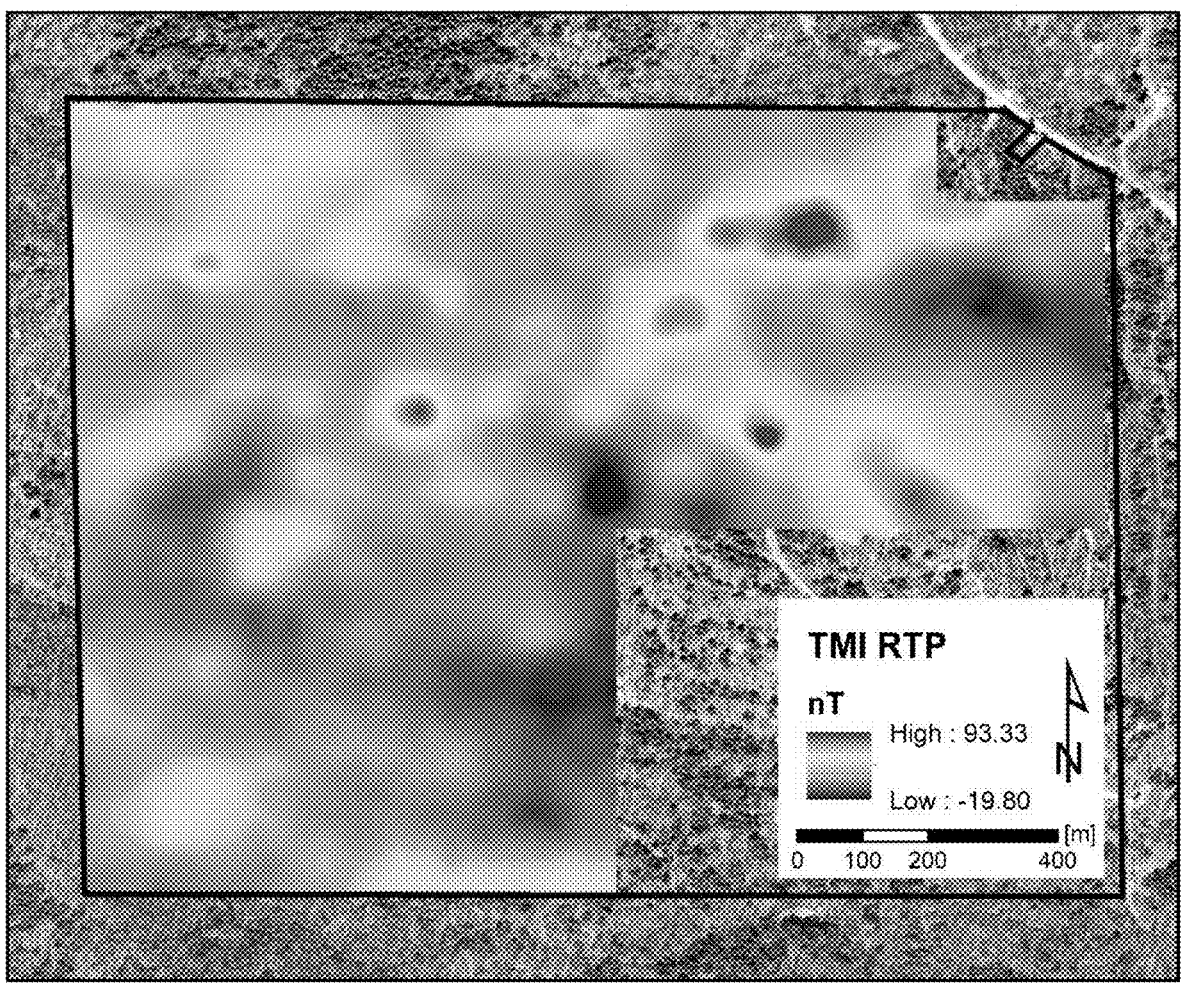
FIG. 10A shows processed total magnetic intensity (TMI) data reduced to the pole (RTP).
Figure 11:
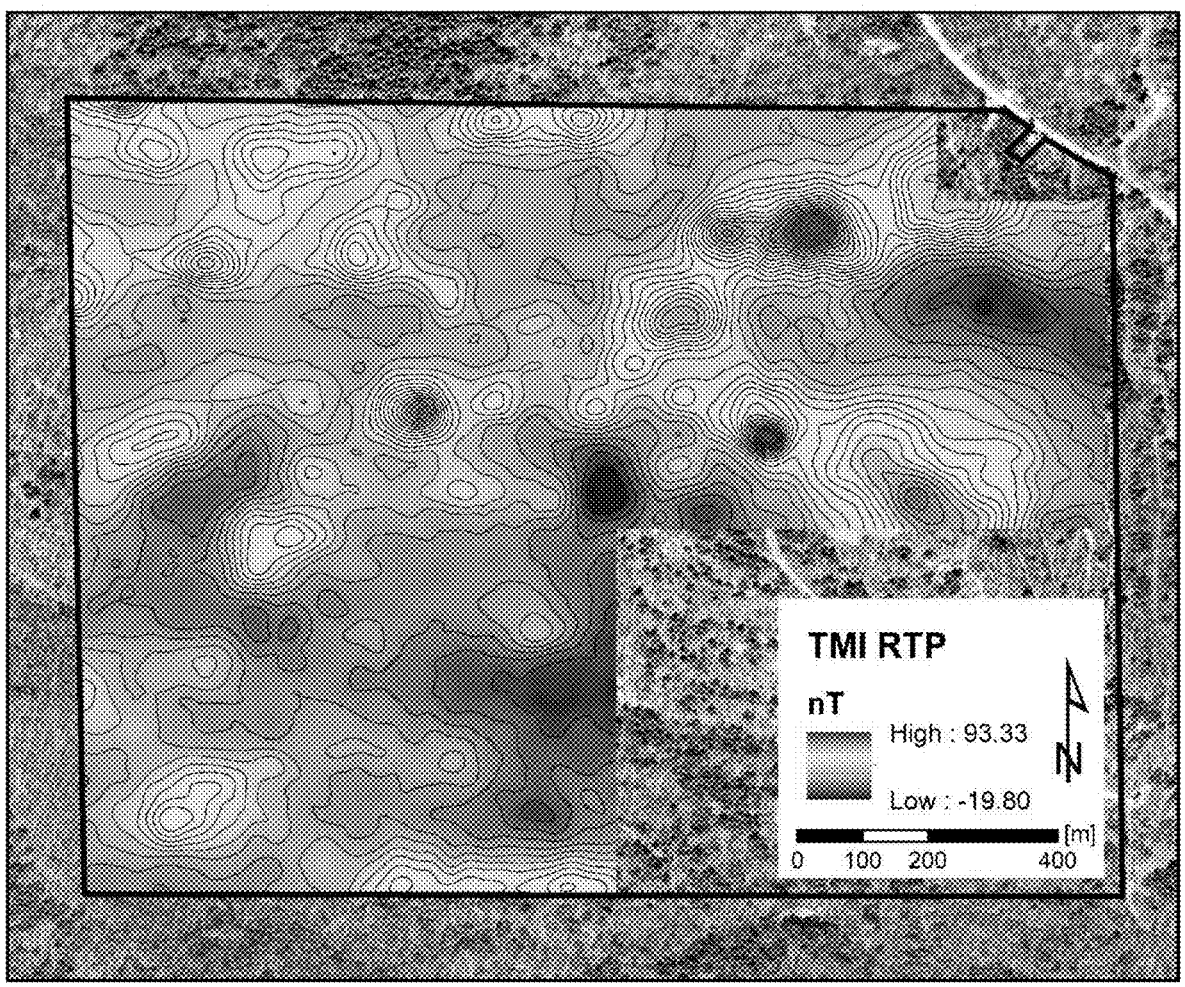
FIG. 11 shows TMI RTP data with 5 nT contours.

While the raw aeromagnetic datasets revealed some of the larger anthropogenic anomalies, there were considerable errors and artifacts introduced to the datasets as a result of sensor motion and diurnal magnetic field variations (FIG. 8, Raw uncorrected total magnetic field data. Note the ~15 nT heading errors, and ~10 nT between grid diurnal errors before base station correction. The northeastern portion of the dataset is over interpolated and also needs to be clipped before advanced processing). The UAV-based magnetics data underwent a standardized processing routine to highlight anomalies associated with well casings and dim other anthropogenic magnetic anomalies. Initially, raw data files were parsed by downsampling from 1000 Hz to 1 Hz and attaching the GNSS data from the NMEA $GPGGA sentence, which contains time, latitude northing, longitude westing, and altitude information. Next, anomalous dropouts related to sensor errors, or polar dead zones, were removed. The MFAM total field data was diurnally corrected with the aid of a Geometrics G-858 that was used as a base station at $\frac{1}{15}$ Hz (FIG. 9, Diurnal variation in magnetic total field intensity recorded at $\frac{1}{15}$ Hz with a Geometrics G-858 magnetometer base station. The total magnetic field intensity F changed by >15 nT throughout the survey. Raw data in red and data smoothed over a 3-minutes (13 point) moving average in blue.). Heading errors of up to 15 nT in the raw total magnetic field data can be seen as large stripes and were corrected with a line leveling algorithm (FIG. 10A, processed total magnetic intensity (TMI) data reduced to the pole (RTP)). The 12th generation International Geomagnetic Reference Field (IGRF) regional total magnetic field values were calculated for the date, location, and elevation of the surveys (Thébault et al. 2015), in order to determine the residual total magnetic intensity (TMI). These point data were then converted to a raster grid of 5 m pixels using kriging interpolation. The raster grid was low-pass filtered using a 3×3 unweighted moving average kernel convolution. The effect of the local geomagnetic-field direction at the survey location was removed with a reduction to the pole filter (RTP) to create a TMI RTP raster (FIG. 11, TMI RTP data with 5 nT contours). A final TMI RTP map of 5 nT contours was created to locate the peak amplitudes of potential wells.

Figure 10B:
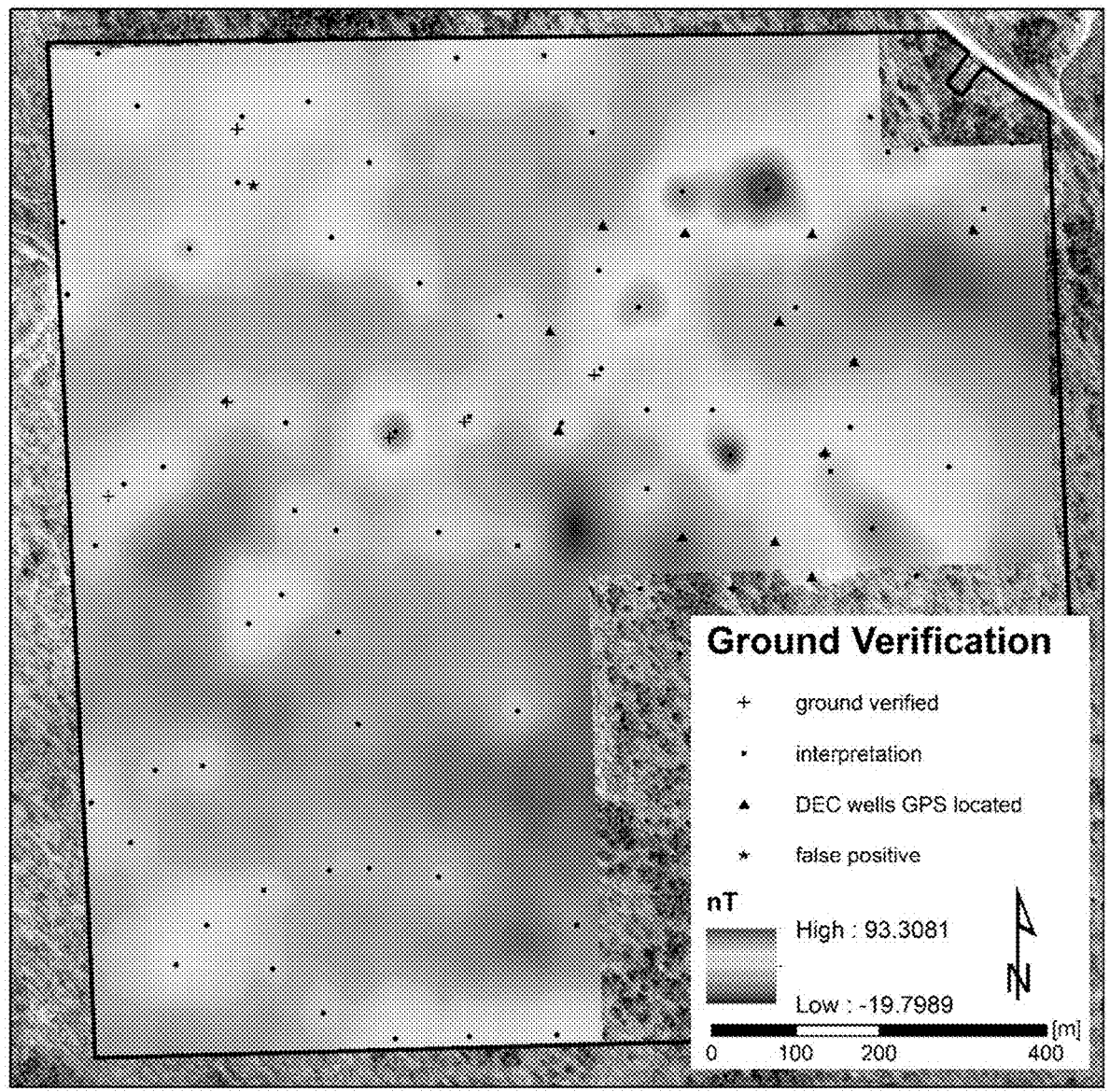
FIG. 10B shows results of ground verification survey and previously GPS mapped wells by the New York State Department of Environmental Conservation.

FIG. 10B shows a map showing results of ground verification survey and previously GPS mapped wells by the New York State Department of Environmental Conservation.

Figure 12:
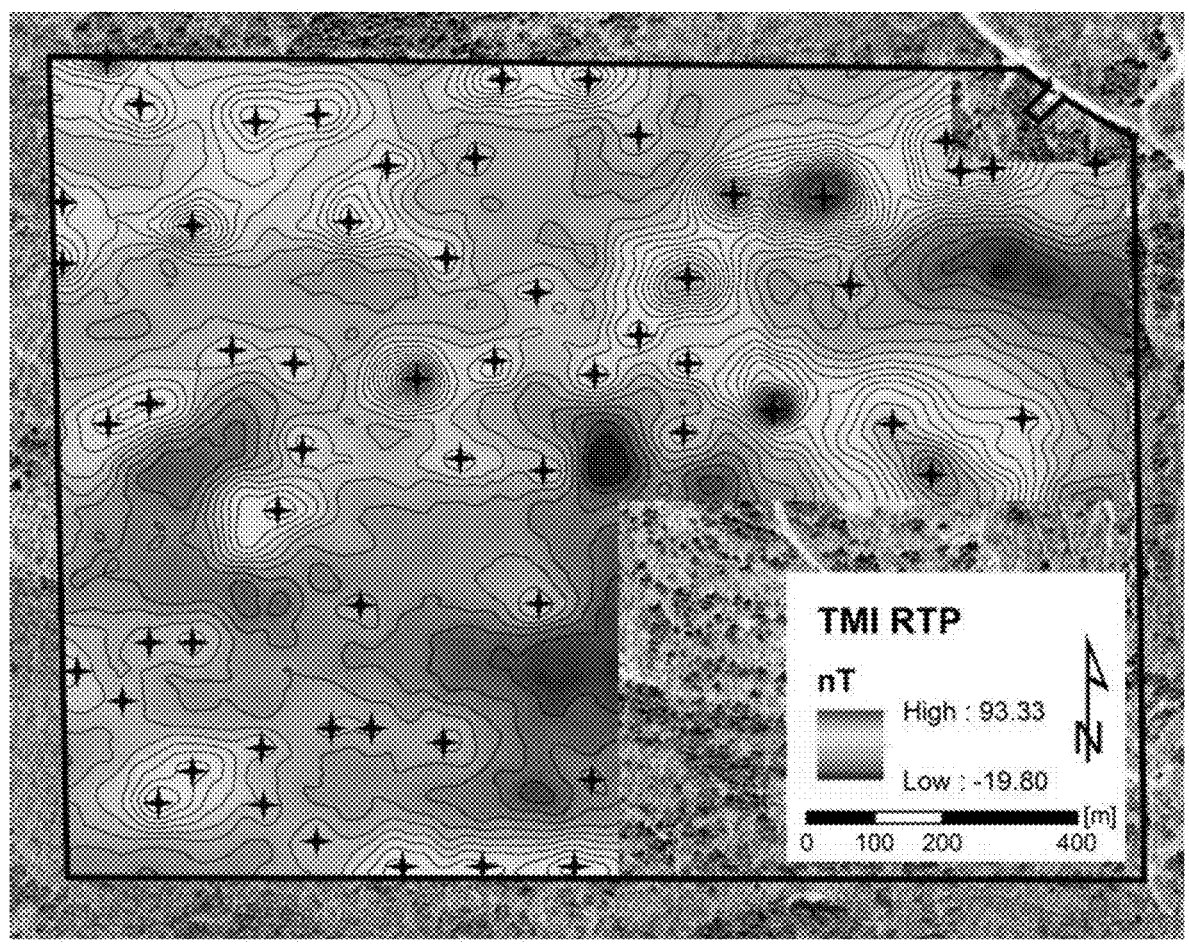
FIG. 12 shows TMI RTP with 5 nT contours and putative well locations as crosses.
Figure 13:
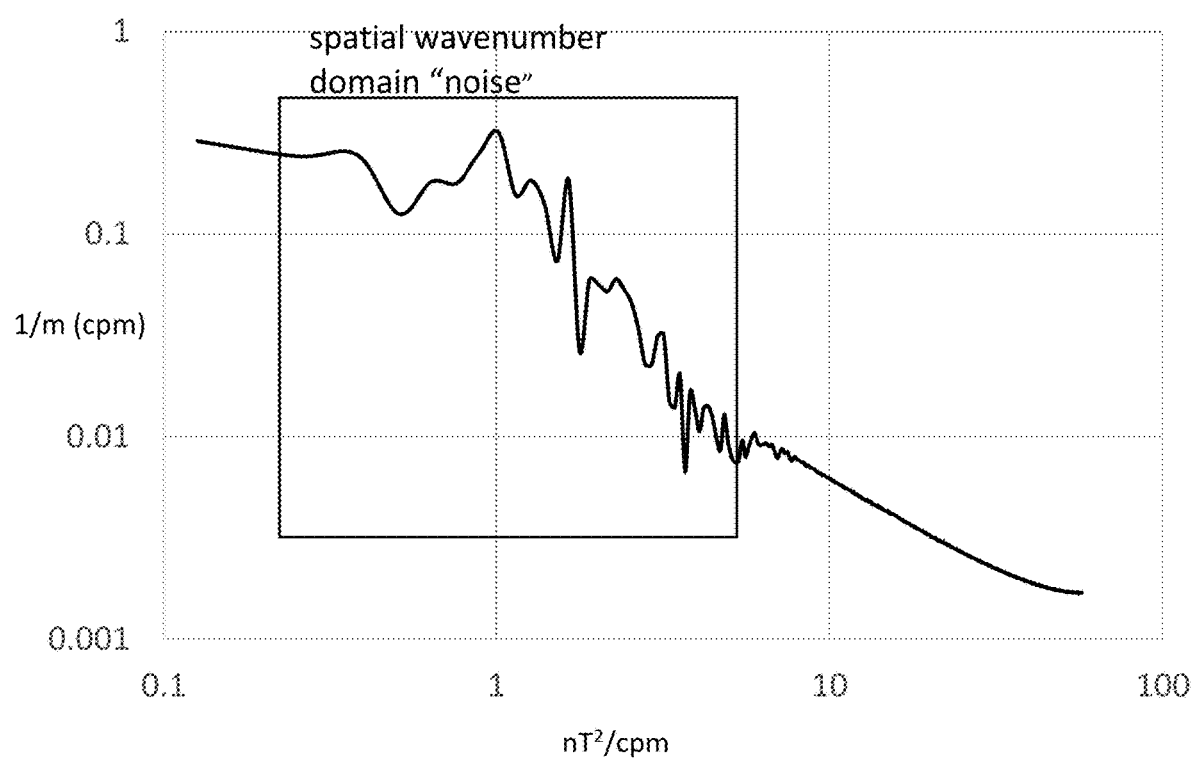
FIG. 13 shows noise structure and coherency.

Nikulin and de Smet (2019) compared ground and UAV-based magnetic surveys to determine optimal flight parameters like altitude, speed, and line spacing over a single well. In this follow-up study we successfully conducted a wide-area UAS magnetic survey to detect and map orphaned and abandoned oil and gas wells in Cattaraugus County, New York. 1.08 km² (267 acres) of magnetic data were collected in three missions in less than four hours and located 28 previously undocumented well locations (FIG. 12, TMI RTP with 5 nT contours and putative well locations as crosses). Each individual mission covered 0.36 km² and lasted 69-82 minutes (Table 1).

of 10-15 km/day for a single operator is in order. Consequently, a terrestrial survey of the size and scope collected in Olean, N.Y. would take at 4-6 working days and could only be conducted in the seasonal transitions between Fall-Winter and Winter-Spring when brush undergrowth is slightly less dense and the air temperature allows for longer working days. During other times of the year, environmental conditions, dense vegetation, or thick snow cover in this region make wide-area terrestrial magnetic surveys time- and cost-prohibitive.

Hybrid UAS magnetic surveys are more operationally efficient than terrestrial or piloted aeromagnetic surveys to detect and map orphaned and abandoned oil and gas wells. Operation of the UAS systems introduces some magnetic noise, however, a 3-4 m separation between the UAV and the magnetometers is found to be sufficient to suppress the effect of the noise on the desired signal. UAS aeromagnetic surveys can be conducted over hazardous environments and difficult terrain that may otherwise be effectively inaccessible for terrestrial or piloted surveys at low altitudes.

A supervised trained algorithm may be used to improve the data analysis, to identify wells and lower false alarms. Such an algorithm is trained according to known well data which may be before acquisition, or based on confirmation after a survey. This may account for different types of wells, their age, geologic formations, anthropogenic artifacts other than well casings, and the like.

Example 2 Detection of Unexploded Ordnance

To ensure data acquisition at the high signal-to-noise ratio needed for effective isolation of relatively weak magnetic

TABLE 1

Total and within transect flight duration. Total within survey flight time 3:22:40 and total flight time 3:49:18 for three flights. All flight times in UTC time.

| Flight | Takeoff | Start transects | End transects | Landing | Within survey | Total flight |
|--------|---------|-----------------|---------------|---------|---------------|--------------|
| 1 | 17:05:18 | 17:11:19 | 18:19:43 | 18:23:25 | 1:08:24 | 1:18:07 |
| 2 | 18:54:22 | 18:57:29 | 19:58:09 | 20:03:32 | 1:00:40 | 1:09:10 |
| 3 | 20:17:35 | 20:19:16 | 21:32:52 | 21:39:36 | 1:13:36 | 1:22:01 |

It should be noted that each survey flight used approximately 2 liters of fuel, or approximately ½ of the fuel tank of the UMT Cicada UAS. Therefore, flights could easily cover a much greater area and we estimate that if we excluded the take-off, approach, and landing sequences and increased flight speeds speed, the entire square kilometer parcel could be covered in a single 2-2.5 hour aerial survey, though FAA Part 107 visual line-of-sight rules are limiting. An approved FAA 107.31 visual line of sight aircraft operator waiver would theoretically allow longer missions.

A terrestrial survey (ground level) conducted over the area with dimensions and spatial resolution, would take at least 15.66 hours, or approximately two 8 hour work days to conduct, assuming a walking speed of 1 m/s, or 3.6 km/h. While this rate of magnetic data collection is considered standard, it is derived from relatively small surveys and its application to a wide-areas survey is inaccurate, given the terrain, dense vegetation, and the size and weight of a conventional terrestrial magnetometer systems. Furthermore, the 15.66 hour survey time estimate is based on an assumption of constant data acquisition with no breaks for the operator or battery replacement times factored into the calculation. Perhaps a more reasonable maximum estimate signals at elevation, it is necessary to establish the sensitivity of the MFAM unit to the magnetic interference fields generated by the operation of the gas-powered engine and powerful electric rotors of the Cicada-M UAV hybrid gas-electric system were measured. The minimal vertical separation of the MFAM unit, encased in a protective UMT MagPike ballistic foam case, from the UAV base was measured. The sensors of the MFAM were oriented in opposing direction, recording magnetic field gradient to allow for faster in-field processing of the datasets. Depending on the throttle of the engine, magnetic interference from the engine dissipated beyond the limit of detection at vertical separation of 1.7-2.4 meters, with 1.7 m correlating to the lowest engine RPM and 2.4 m correlating to the highest RPM allowed by the engine. Various tether lengths and flight elevations were tested to determine the optimal survey configuration of sensor, UAV, engine, and rotors. A vertical separation of 4 m, suspending the MFAM acquisition system using three soft non-magnetic cords attached to the propeller beams of the UMT Cicada-M were thereafter employed, and no detectable magnetic interference correlating to engine or rotor operations (regardless of throttle levels) were evident. Thus, a properly configured hybrid Cicada-M UAV platform is suitable for accurate magnetic surveying.

Figure 23:
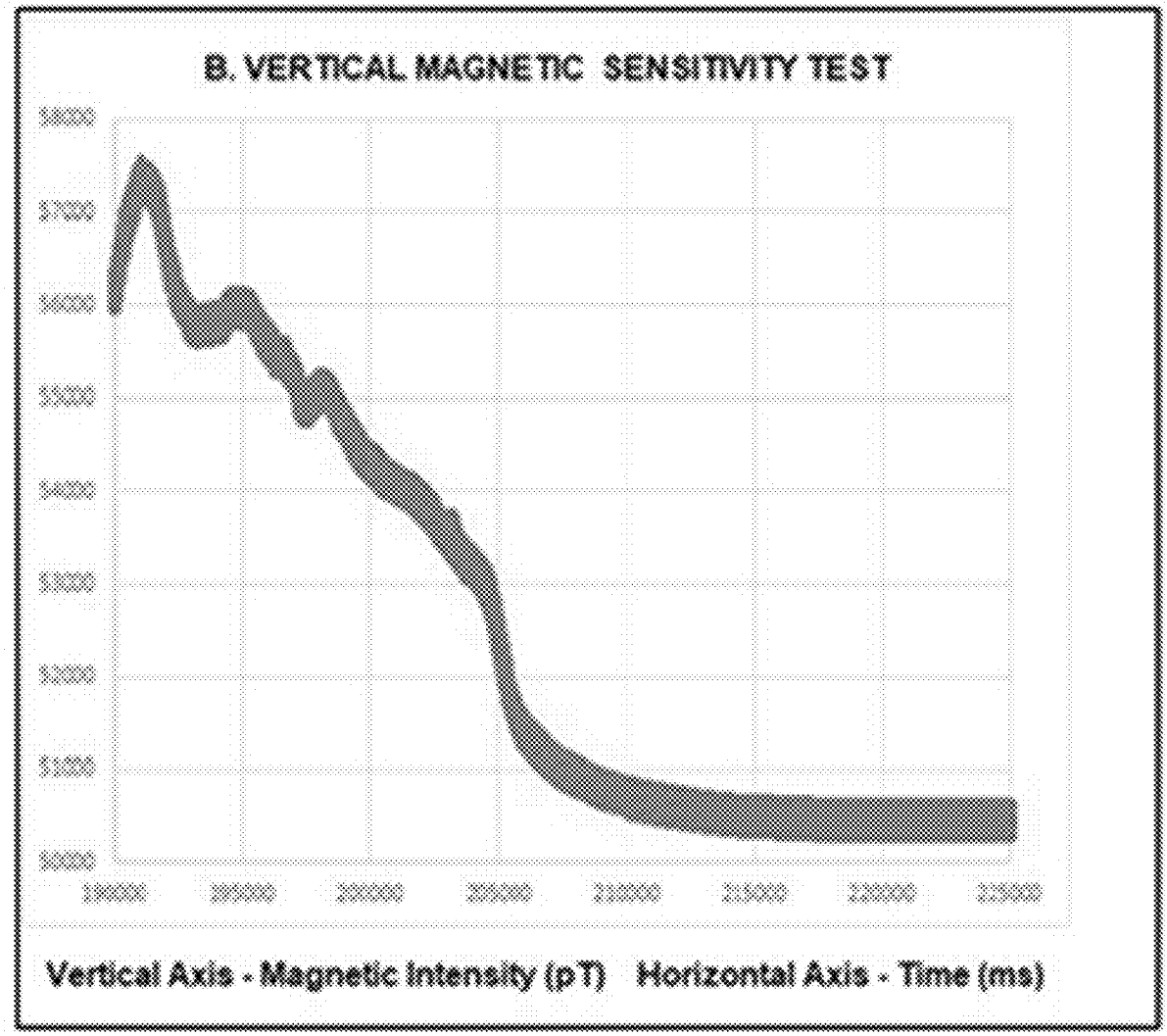
FIG. 23 shows results of a vertical magnetic sensitivity test for unexploded munitions.
Figure 24A:
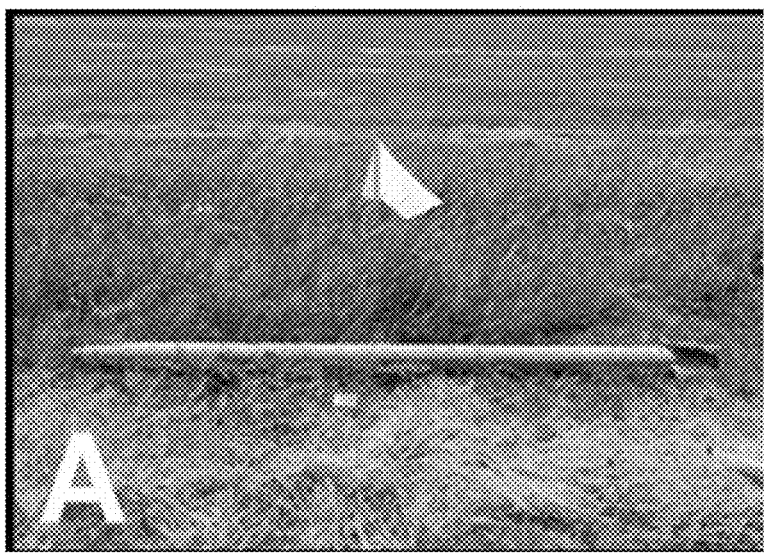
FIGS. 24A-24D show various simulated UXOs (FIGS. 24A-24C) and a magnetic intensity map of inert simulated UXOs in a controlled field trial site (FIG. 24D) with letters on the map matching the position and type of the planted object.
Figure 24B:
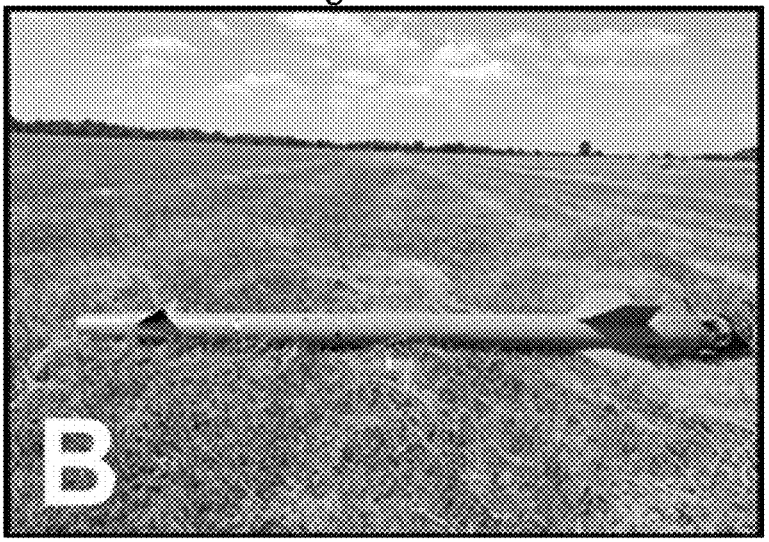
Figure 24C:
Figure 24D:
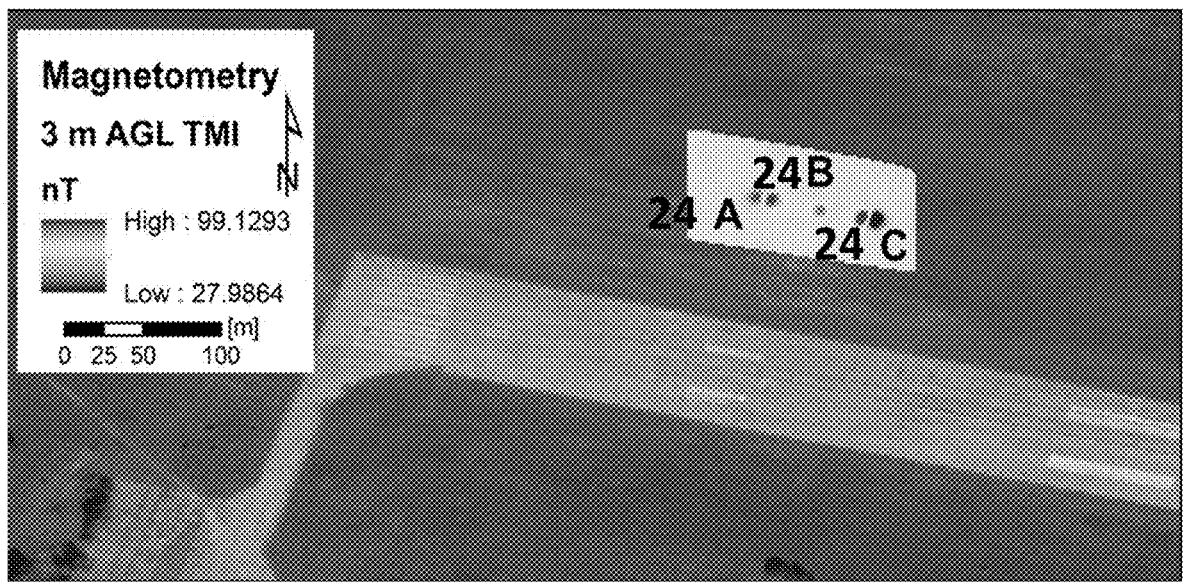

In a second experiment, the vertical sensitivity of the UAV-mounted MFAM unit to a magnetic anomaly generated by a single BM-21 UXO round was determined, and the optimal surveying parameters to target this type of UXO defined. FIGS. 24A-24D show various simulated UXOs (FIGS. 24A-24C) and a magnetic intensity map of inert simulated UXOs in a controlled field trial site (FIG. 24D) with letters on the map matching the position and type of the planted object. A 3 m concrete-filled pipe, similar in mass, length and metal content to a 122 mm composite BM-21 round, commonly consisting of the projectile and a metal fragmentation coil wrapped onto the inner wall of the round (FIG. 24A) The simulated UXO was oriented East-West on a concrete pad away from other similarly-sized metallic objects, as shown in FIG. 24D. The UAV system carrying the attached MFAM unit was manually guided to the center of the simulated UXO and proceeded to rise vertically at a rate of 1 m/s, to a total altitude of 34 meters above ground. Results of the second experiment are presented in FIG. 23, where the horizontal axis represents altitude and the vertical axis records total magnetic intensity. As anticipated, the magnetic anomaly was most pronounced directly above the simulated UXO and its intensity dissipated at a geometric progression, until fully disappearing at an altitude of ~20 m above ground.

Following the vertical sensitivity test, a number of additional UAV flights were conducted over a controlled area, seeking to determine optimal survey parameters that allow to highlight the presence of the simulated BM-21 UXO, while filtering out magnetic noise from metallic debris. Experimentally, it was determined that at a sensor altitude of 3 m AGL (flight altitude of 7 m AGL), the optimal balance between ability to resolve a simulated BM-21 UXO and limiting false flags from metallic clutter smaller than the test object were achieved. Similarly, a survey spacing of 3 m permitted consistent identification of magnetic anomalies associated with the targeted UXO type. Finally, an optimal traverse speed of 3 m/s was determined, allowing both provide high sampling density (MFAM samples at 1000 samples/second, while the GPS time stamp is placed only every second) and aerodynamic stabilization of the MagPike platform in flight. In sum, a 3-3-3 formula for UAV-based aeromagnetic acquisition was defined: 3-meter sensor elevation, 3-meter traverse spacing and 3 m/s acquisition speed. The speed of acquisition can be further increased up to 10 m/s, if the GPS time stamp frequency is increased to match that of MFAM sampling density.

Following controlled site testing and optimization of UAV survey parameters in a relatively small contained area, a series of field trials were conducted to determine if automated UAV aeromagnetic surveys over larger areas would allow successful detection of inert MBRL UXOs. Initial controlled field trials on the grounds of Chernihiv Airfield installation in Northern Ukraine, where a series of inert training UXOs were placed at ~25 m intervals along a linear East-West transect were conducted. Three types of inert munitions were tested—a) 122 mm BM-21 MBRL round, b) SA 22 type anti-aircraft rocket, c) solid metal core 152 mm artillery shell. From this configuration, it was sought to be determined if the system could not only effectively detect, but also discriminate MBRL UXOs from similarly sized and shaped non-magnetic UXOs and a highly-magnetic, but significantly smaller 152 mm artillery rounds.

Figure 25A:
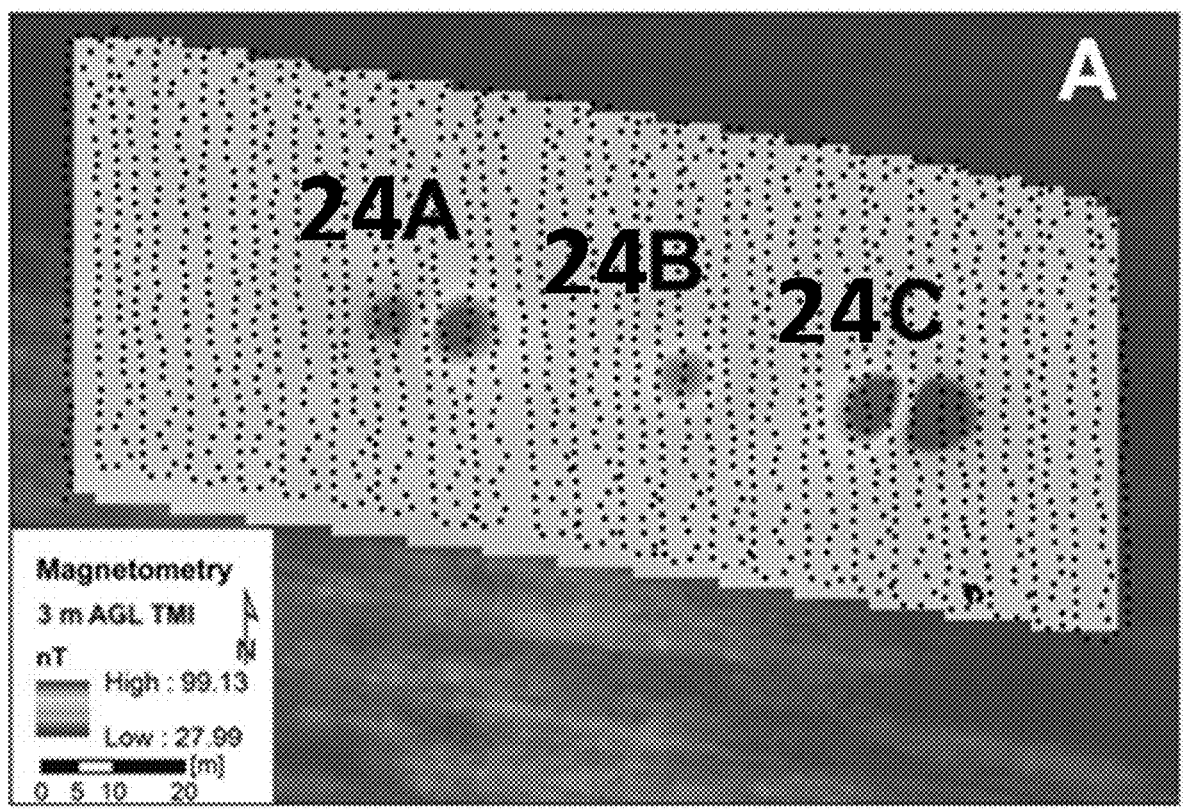
FIGS. 25A and 25B show magnetic intensity maps over controlled site, with small black dots indicating GPS tracks of the conducted North-South UAV flights in 25A, and the dots absent in 25B to more clearly show the magnetic intensity. Black letters indicate the anomalies associated with simulated UXO objects.

UAV surveys were conducted North-South, perpendicular to the transect in the 3-3-3 configuration, as identified in the controlled trials. Raw magnetic data were parsed and de-striped, with correct GPS time markers (FIG. 25A). A simple line leveling technique was then applied to each of the flight lines for every individual flight. This removed the directional interference in the data. Subsequently, the regional total magnetic field for the controlled site was removed. These values were calculated using the International Geomagnetic Reference Field (IGRF) Model. The residual total magnetic intensity was plotted using the Kriging Interpolation to turn the values into rasters and create an image of the data. From there a low-pass convolution filter was applied to remove image background noise and the raster color scale and inversion was adjusted to most effectively intensify the magnetic variation in the data, thus clarifying anomalies which represent UXOs. It was then easier to observe magnetic anomalies with a higher confidence that detected UXOs were not false positive errors.

FIG. 25A thus shows magnetic intensity maps over controlled site, with small black dots indicating GPS tracks of the conducted North-South UAV flights in A. Black letters indicate the anomalies associated with simulated UXO objects.

Figure 25B:
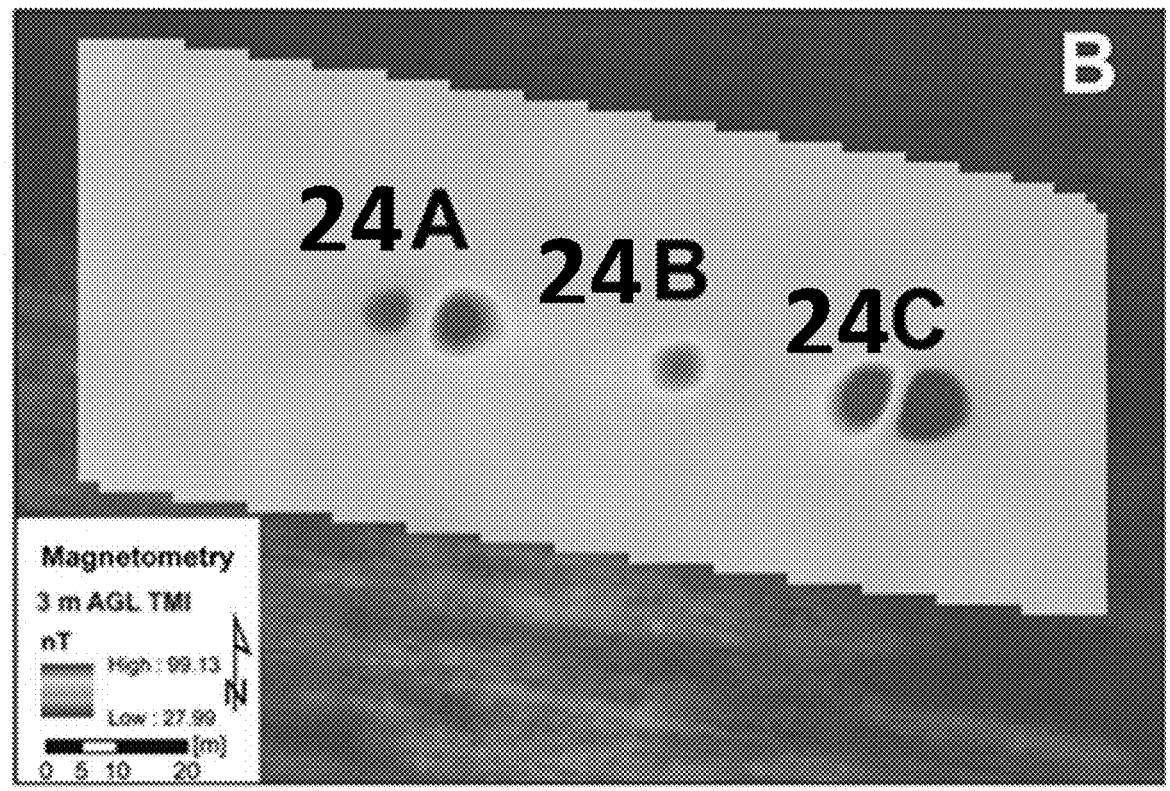

In the processed and mapped dataset, there were three well-defined dipole anomalies—labeled A, B, and C in FIG. 25B. Anomaly 24A was associated with the inert BM-21 round, anomaly 24B was associated with the SA-22 inert missile, and anomaly 245C was associated with the inert metal-core 152 artillery round. What is immediately obvious is that the largely metal BM-21 (FIG. 24A) round has a considerably more intense magnetic signature than a similar-sized and shaped, but largely non-magnetic SA-22 inert round (FIG. 24B). Conversely, the metal-core, but much smaller 152 mm artillery projectile (FIG. 24C) generated a magnetic intensity anomaly of comparable size to the BM-21 round. This result was instructive, as it allowed calibration of the processing filters to specifically identify the metal content and size of the BM-21. In the presence of massive magnetic UXOs of smaller caliber, there may be false flag alarms associated with the high magnetic intensity fields generated by such objects. The inert 152 mm round was a solid metal core training projectile without an explosive chamber, which represents a very atypical object to be encountered in the field.

Following successful detection of the inert BM-21 round in controlled trials, survey platform, as well as processing and detection algorithms, were tested at a live test site, the Ukrainian Armed Services Honcharivs'ke proving grounds. An area where two MBRL rounds failed to explode on impact was identified: a 220 mm BM-27 Uragan ["Hurricane"] projectile and a 122 mm BM-21 Grad ["Hail"] projectile. This area allowed safe access via a reinforced concrete road, which in turn served as a staging and take-off area for the UAV.

Figure 26A:
FIGS. 26A-26C, shows total magnetic field data at blind test site, with two anomalies associated with UXO objects marked 26A and 26B in FIG. 26C. The concrete road can also clearly be seen to the south in the bottom of the magnetic map, likely because of a large amount of rebar used in its construction.
Figure 26B:
Figure 26C:
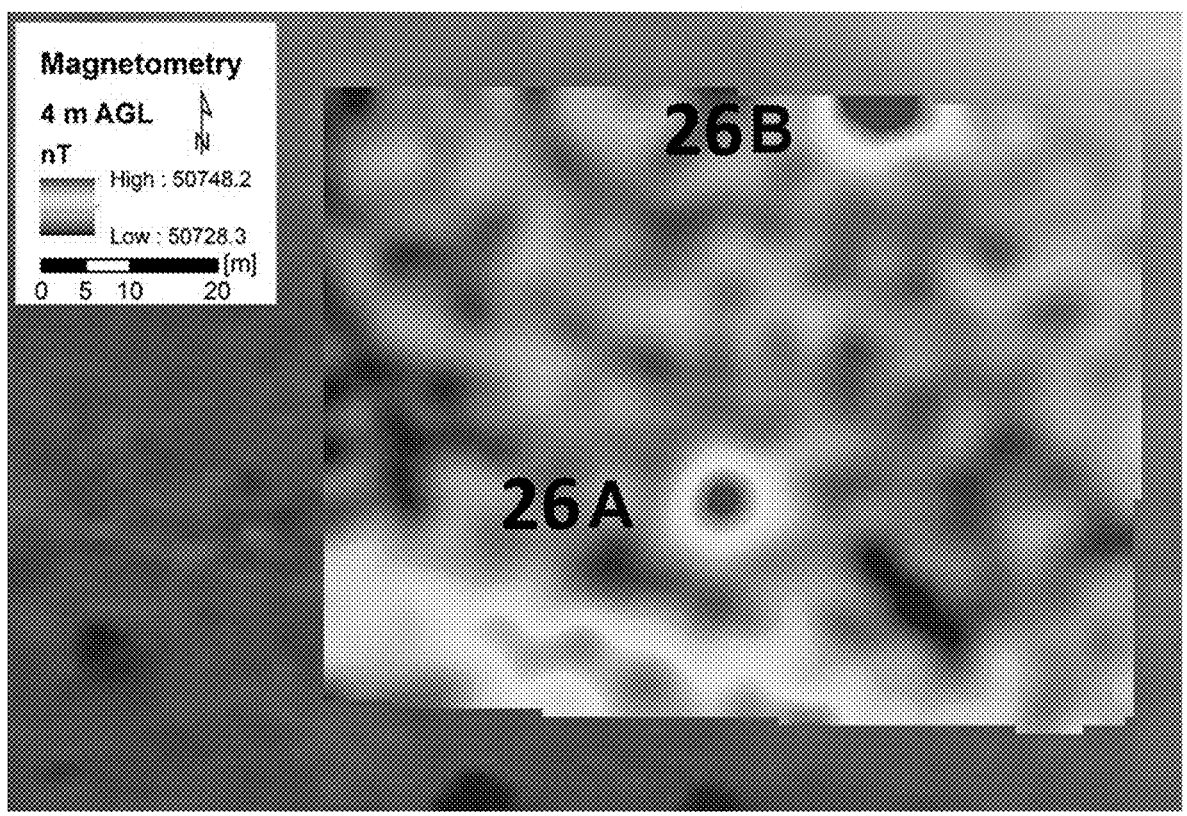

A survey of the live site was conducted using the same 3-3-3 parameters as defined in the controlled experiments and the dataset was analyzed relying on the same processing and mapping protocols. The results from the blind test surveys of live unexploded 122 mm rockets are presented in FIGS. 26A-26C. In the magnetic dataset, two large magnetic anomalies (labeled as 26A and 26B in FIG. 26C) were observed. On initial assessment, informed by results of the controlled trials, the weaker anomaly 26A was hypothesized to be associated with the larger-caliber BM-27 round shown in FIG. 26A, which despite its larger size contains more non-magnetic aluminum in its design. Consequently, the larger anomaly 26B was hypothesized to be associated with the BM-21 UXO shown in FIG. 26B. The assessment and the geographical coordinates of the anomalies was relayed to the operators of the testing site, who conducted a visual survey in indicated areas. Anomaly 26A was immediately identified as a BM-27 round, which was submerged at about a relatively low angle of impact (FIG. 26A). As for anomaly 26B, the assessment took significantly longer, as there were no visible signs of the UXO at the surface; however, upon closer inspection, the search revealed the tail section of a 95% submerged BM-21 round, as seen in FIG. 26B. Critically, the BM-21 tail section was below ground level and would have been impossible to identify in a wide-area visual survey conducted without constraining the search area.

Using the defined parameters for the survey equipment and derived survey air speed and altitude parameters, 27,000 line meters can be surveyed during a single 150 min flight of the hybrid UAV, allowing surveying a 600×600 area in approximately 11 hours. If, the sampling rate of the GPS unit is raised to match the sampling frequency of the magnetometer, the survey can be conducted at 10 m/s air speed and the 600×600 area could be surveyed in 3.5 hours with the same level of accuracy and resulting interpretation confidence.

Application of this methodology may be limited in the presence of tall vegetation and may be influenced by site conditions, including host soil geology, presence of metallic debris, infrastructure and topography, all of which can impact the depth and angle of UXO burial, as well as their successful identification. Perhaps most importantly, impacted areas with vegetation over 10 m tall will force sensor elevation outside the effective range of the survey system. Large near-surface natural and anthropogenic magnetic anomalies may cause constructive or destructive interference within the magnetic datasets, complicating initial analysis.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A unmanned aerial system, comprising:
   a video camera, disposed on an Unmanned Aerial Vehicle (UAV) and configured to view an obstacle ahead of the UAV;
   a magnetic gradiometer comprising at least two magnetometers each having a sensitivity of at least 0.01 nT/Hz suspended in a housing at least 1.7 meters below the UAV;
   an above-ground level sensor, configured to determine an actual above-ground level of the UAV during flight; and
   an automated control unit for the UAV, configured to control the UAV according to a serpentine flight plan at a predetermined above-ground level having an altitude of less than 50 meters, with a vertical deviation from the predetermined above-ground level of the serpentine flight plan dependent on at least the viewed obstruction ahead of the UAV, a predicted interference of the housing with the viewed obstruction, the actual above-ground level of the UAV during flight, and a predetermined Digital Obstacle Model (DOM) representing a computational model of obstacles for the UAV at the predetermined above-ground level prior to flight.

2. The system according to claim 1, further comprising a survey sensor system, configured to generate survey data from the magnetic gradiometer, and the UAV, wherein the UAV has a self-contained power supply to generate the survey data over at least 20 line kilometers of the serpentine flight path in a continuous survey at a speed of 7 meters per second.

3. The system according to claim 2, wherein the magnetic gradiometer is suspended in a non-magnetic housing at least 4 meters below the UAV.

4. The system according to claim 1, further comprising at least one of a Digital Surface Model (DSM) and a Digital Elevation Model (DEM), wherein the DOM is dependent on the at least one of the DSM and the DEM.

5. The system according to claim 1, further comprising a Global Navigation Satellite System (GNSS) in the housing, wherein readings from the magnetic gradiometer are associated with GNSS determined geolocation to generate geotagged data during flight of the UAV.

6. The system according to claim 1, further comprising an autonomous guidance system, responsive to the viewed obstacle ahead of the UAV, configured to perform a vertical avoidance maneuver to avoid collision of the housing based on the viewed obstacle.

7. The system according to claim 1, wherein the UAV has a hybrid power source comprising an internal combustion engine and an electric generator, powering a plurality of electric motors providing lift.

8. A nontransitory computer readable medium for controlling an Unmanned Aerial Vehicle (UAV) according to claim 1 to survey a region, comprising:
   instructions for controlling the UAV to fly according to a serpentine flight plan at a predetermined above-ground level having an altitude of less than 50 meters, subject to vertical obstacle avoidance deviations;
   instructions for determining an actual above-ground level of the UAV during flight;
   instructions for analyzing a video stream representing objects ahead of the UAV and housing; and
   instructions for vertically deviating in real time from the predetermined above-ground level defined by the serpentine flight plan, dependent on at least an obstacle ahead of the UAV present in the video stream, a predicted interference of the housing with the viewed obstruction, the actual above-ground level of the UAV during flight, and a predetermined Digital Obstacle Model (DOM) representing a computational model of obstacles for the UAV at the predetermined above-ground level prior to flight.

9. A method for surveying a region, comprising:
   providing an Unmanned Aerial Vehicle (UAV), comprising:
   a video camera, disposed on a UAV and configured to view an obstacle ahead of the UAV;
   an above-ground level sensor, configured to determine an actual above-ground level of the UAV during flight;
   a survey sensor comprising a magnetic gradiometer within a housing suspended at least 1.7 meters below the UAV during flight, configured to sense measure a vertical magnetic gradient corresponding to local magnetic features of the ground; and
   an automated control unit, configured to control the UAV according to a serpentine flight plan at a predetermined above-ground level having an altitude of less than 50 meters, subject to a vertical deviation from the predetermined above-ground level of the serpentine flight plan dependent on at least the viewed obstacle ahead of the UAV,
   the actual above-ground level of the UAV during flight, a predicted interference of the housing with the viewed obstruction, and a predetermined Digital Obstacle Model (DOM) representing a computational model of obstacles for the UAV at the above-ground level prior to flight;

flying the UAV according to the serpentine flight plan, at the predetermined above-ground level, while monitoring the video camera for the obstacle ahead of the UAV and the housing; and receiving geotagged data from the magnetic gradiometer concurrently with said flying.

10. The method according to claim 9, wherein:
the UAV has a self-contained hybrid internal combustion engine and generator power supply to generate the survey data over at least 20 line kilometers in a continuous serpentine flight plan survey at a speed of 7 meters per second.

11. The method according to claim 9, further comprising autonomously guiding the UAV, responsive to the viewed obstacle ahead of the UAV, and autonomously performing a vertical flight deviation avoidance maneuver based on the viewed obstacle to avoid interference with the housing.

12. The method according to claim 9, wherein the flight plan is dependent on at least one of a Digital Surface Model (DSM) and a Digital Elevation Model (DEM).

13. The method according to claim 9, wherein the UAV comprises a Global Navigation Satellite System (GNSS), and wherein survey sensor readings are associated with GNSS-determine geolocation to provide the geotagged data.

14. The method according to claim 9, further comprising correcting data representing the vertical magnetic gradient for a diurnal variation in magnetic field.

15. The method according to claim 9, wherein:
the UAV comprises a hybrid electric-internal combustion power train, capable of providing sustained flight in excess of 60 minutes at a rate of 7 meters per second;
the above-ground level is 40 meters or less;
the above-ground level sensor comprises a LiDAR;
the magnetic gradiometer comprises at least two vertically separated magnetometers, having a sensitivity of at least 1 pT/Hz, configured to sense magnetic objects at a distance of between 50 meters;
the serpentine flight path comprises a serpentine sequence of magnetic north-south traverses;
the predetermined Digital Obstacle Model (DOM) is derived from a Digital Surface Model (DSM) and a Digital Elevation Model (DEM), and comprises at least one obstacle along the flight path taller than the above ground level;
the obstacle comprises a tree;
further comprising receiving magnetic gradiometer outputs from the at least two separated magnetometers synchronized with geographic location data obtained from a Global Navigation Satellite System (GNSS), compensated for diurnal ambient magnetic field variations.

16. The method according to claim 15, further comprising acquiring magnetic gradiometer outputs having a sensitivity of at least 1 pT/Hz, at a sampling rate of at least 1000 Hz, and at a spatial resolution of less than 2.5 meters, to detect at least one well having a magnetically permeable well casing.

17. The method according to claim 9, wherein a set of proximate environmental parameters from a survey flight of the UAV over a parcel is processed according to a supervised trained algorithm to identify predetermined features corresponding to labelled features of a set of training data for the supervised trained algorithm.

18. The method according to claim 16, further comprising:
removing dropouts in the related to at least one of sensor errors and polar dead zones;
downsampling data from the survey sensor to about 1 Hz, and appending Global Navigation Satellite System (GNSS) geolocation data to a data record;
diurnally correcting total field magnetic datasets comprising data records from the survey sensor with a magnetic base station;
correcting heading errors with a statistical line leveling algorithm;
determining a residual total magnetic intensity (TMI);
converting TMI to a raster grid using kriging interpolation;
low-pass filtering the raster grid using an unweighted moving average kernel convolution;
removing an effect of a local geomagnetic-field direction with a reduction to the pole filter (RTP) to create a TMI RTP raster;
creating a TMI RTP map to locate peak amplitudes; and
plotting the peak amplitudes over a topographic map.

19. The method according to claim 18, wherein the topographic map shows at least one of locations of wells, locations of pipe, locations of unexploded ordnance, and locations of anthropogenic magnetic anomalies.

20. A unmanned aerial system, comprising:
a video camera, disposed on an Unmanned Aerial Vehicle (UAV) and configured to view an obstacle ahead of the UAV;
a magnetic gradiometer comprising at least two magnetometers each having at least two a sensitivity of less than or equal to 1 pT/Hz and a sampling rate of at least 1,000 Hz suspended in a housing about 4 meters below the UAV;
a LIDAR above-ground level sensor, configured to determine an actual above-ground level of the UAV during flight; and
an automated control unit for the UAV, configured to control the UAV according to a serpentine flight plan at a predetermined above-ground level having an altitude of less than 50 meters, with a dynamically determined vertical deviation from the predetermined above-ground level of the serpentine flight plan dependent on at least the viewed obstruction ahead of the UAV, a predicted interference of the housing with the viewed obstruction, the actual above-ground level of the UAV during flight, and a predetermined Digital Obstacle Model (DOM) representing a computational model of obstacles for the UAV at the predetermined above-ground level prior to flight.

* * * * *